US012789586B2

(12) United States Patent
Hu et al.

(10) Patent No.: US 12,789,586 B2
(45) Date of Patent: Nov. 10, 2026

(54) THERMAL MANAGEMENT SYSTEM

(71) Applicant: SANHUA HOLDING GROUP CO., LTD., Shaoxing City (CN)

(72) Inventors: Xuanzhe Hu, Shaoxing City (CN); Jiangfeng Zhou, Shaoxing City (CN)

(73) Assignee: SANHUA HOLDING GROUP CO., LTD., Shaoxing City (CN)

( * ) Notice: Subject to any disclaimer, the term of this patent is extended or adjusted under 35 U.S.C. 154(b) by 330 days.

(21) Appl. No.: 18/238,486

(22) Filed: Aug. 26, 2023

(65) Prior Publication Data

US 2023/0398835 A1 Dec. 14, 2023

Related U.S. Application Data

(63) Continuation of application No. PCT/CN2022/077829, filed on Feb. 25, 2022.

(30) Foreign Application Priority Data

Feb. 26, 2021 (CN) ......................... 202110218637.8
Feb. 26, 2021 (CN) ......................... 202110218639.7

(51) Int. Cl.
*B60H 1/00* (2006.01)
*B60K 11/02* (2006.01)

(52) U.S. Cl.
CPC ..... *B60H 1/00899* (2013.01); *B60H 1/00278* (2013.01); *B60H 1/00314* (2013.01);
(Continued)

(58) Field of Classification Search
CPC ............ B60H 1/00899; B60H 1/00278; B60H 1/00314; B60H 1/00921;
(Continued)

(56) References Cited

U.S. PATENT DOCUMENTS

2018/0201094 A1* 7/2018 Kawano ................ F25B 43/006
2019/0366800 A1* 12/2019 Durrani .............. B60H 1/00907
(Continued)

FOREIGN PATENT DOCUMENTS

CN 103373193 A 10/2013
CN 107020913 A 8/2017
(Continued)

*Primary Examiner* — Elizabeth J Martin
*Assistant Examiner* — Adam Dorrel Moore
(74) *Attorney, Agent, or Firm* — Cheng-Ju Chiang

(57) ABSTRACT

A thermal management system includes a first flow direction switching device, a first throttling device, a first heat exchanger, a second heat exchanger and a third heat exchanger. The first flow direction switching device includes a first port, a second port and a third port. In a first working state, the first port communicates with at least one of the second port and the third port. In a heating mode, the first flow direction switching device is in the first working state; the first port communicates with a first end port of the first throttling device; a second end port of the first throttling device communicates with an outlet of the first heat exchanger. Both the second heat exchanger and the third heat exchanger can realize throttling function through the first throttling device, so as to simplify the thermal management system. A control method thereof is also disclosed.

16 Claims, 16 Drawing Sheets

(52) U.S. Cl.
CPC .... *B60K 11/02* (2013.01); *B60H 2001/00307* (2013.01); *B60H 2001/00942* (2013.01)

(58) Field of Classification Search
CPC ........... B60H 2001/00307; B60H 2001/00942; B60H 2001/00928; B60H 2001/00935; B60H 2001/00949; B60K 11/02; B60K 2001/003; B60K 2001/005; B60K 2001/006
See application file for complete search history.

(56) References Cited

U.S. PATENT DOCUMENTS

| | | | | |
|---|---|---|---|---|
| 2020/0070628 | A1* | 3/2020 | Tan | F25B 47/02 |
| 2020/0338950 | A1* | 10/2020 | Kim | B60H 1/00921 |
| 2021/0309070 | A1* | 10/2021 | Ishizeki | B60H 1/3205 |

FOREIGN PATENT DOCUMENTS

| | | | |
|---|---|---|---|
| CN | 107139680 | A | 9/2017 |
| CN | 107139684 | A | 9/2017 |
| CN | 109228962 | A | 1/2019 |
| CN | 109774409 | A | 5/2019 |
| CN | 210951942 | U | 7/2020 |
| CN | 113173049 | A | 7/2021 |
| CN | 113173050 | A | 7/2021 |
| WO | 2018/189805 | A1 | 10/2018 |
| WO | 2022/179593 | A1 | 9/2022 |

* cited by examiner

THERMAL MANAGEMENT SYSTEM

CROSS-REFERENCE TO RELATED APPLICATIONS

The present disclosure is a bypass continuation of National Phase conversion of International (PCT) Patent Application No. PCT/CN2022/077829, filed on Feb. 25, 2022, which further claims priority of a Chinese Patent Application No. 202110218637.8, filed on Feb. 26, 2021 and titled "THERMAL MANAGEMENT SYSTEM", and a Chinese Patent Application No. 202110218639.7, filed on Feb. 26, 2021 and titled "THERMAL MANAGEMENT SYSTEM", the entire content of which is incorporated herein by reference.

TECHNICAL FIELD

The present disclosure relates to the technical field of thermal management, in particular to a thermal management system.

BACKGROUND

An air conditioning system in a vehicle, for example an electric vehicle, is capable of adjusting the environmental temperature in the passenger compartment and performing thermal management of the battery. Related thermal management systems include refrigerant systems and coolant systems. Multiple throttling valves are provided in the refrigerant system, resulting in a relatively large number of system components and a relatively complex system structure.

SUMMARY

In view of the above-mentioned problem in the related art, the present disclosure provides a thermal management system with a relatively simple structure.

In order to achieve the above object, the present disclosure adopts the following technical solution:

a thermal management system, including: a compressor, a first heat exchanger, a second heat exchanger, a third heat exchanger, a first throttling device and a first flow direction switching device; the first flow direction switching device including a first port, a second port and a third port; the first flow direction switching device having a first working state; in the first working state, the first port communicating with at least one of the second port and the third port; the thermal management system including a controller; the thermal management system having a heating mode; the heating mode being executed under the control of the controller; in the heating mode, the first throttling device being in a throttling state; the first flow direction switching device being in a first working state; an outlet of the compressor communicating with an inlet of the first heat exchanger; an outlet of the first heat exchanger communicating with a second end port of the first throttling device; a first end port of the first throttling device communicating with the first port; the first port communicating with the second port; the second port communicating with a first end port of the second heat exchanger; a second end port of the second heat exchanger communicating with an inlet of the compressor; or, the first port communicating with the third port; the third port communicating with a first end port of the third heat exchanger; a second end port of the third heat exchanger communicating with the inlet of the compressor.

In the thermal management system of the present disclosure, in the heating mode, the first port of the first flow direction switching device communicates with the first end port of the first throttling device; the second end port of the first throttling device communicates with the outlet of the first heat exchanger; when the first port communicates with the second port, the first end port of the second heat exchanger communicates with the second port; when the first port communicates with the third port, the first end port of the third heat exchanger communicates with the third port; both the second heat exchanger and the third heat exchanger can realize throttling function through the first throttling device. As a result, the number of components of the thermal management system is reduced and the thermal management system is simplified.

A control method of a thermal management system, the thermal management system including a compressor, a first heat exchanger, a second heat exchanger, a third heat exchanger, a first throttling device, a first flow direction switching device and a controller; the first flow direction switching device including a first port, a second port and a third port; the first flow direction switching device having a first working state; in the first working state, the first port communicating with at least one of the second port and the third port; the controller being configured to execute the control method of the thermal management system, so as to control a working state of the thermal management system;

the control method of the thermal management system including: controlling the thermal management system to enter a heating mode by the controller; in the heating mode, the first throttling device being in a throttling state; the first flow direction switching device being in the first working state; an outlet of the compressor communicating with an inlet of the first heat exchanger; an outlet of the first heat exchanger communicating with a second end port of the first throttling device; a first end port of the first throttling device communicating with the first port; the first port communicating with the second port; the second port communicating with a first end port of the second heat exchanger; a second end port of the second heat exchanger communicating with an inlet of the compressor; or, the first port communicating with the third port; the third port communicating with the first end port of the third heat exchanger; the second end port of the third heat exchanger communicating with the inlet of the compressor.

In the method of the thermal management system of the present disclosure, the controller controls the thermal management system to operate in the heating mode. In the heating mode, the first port of the first flow direction switching device communicates with the first end port of the first throttling device; the second end port of the first throttling device communicates with the outlet of the first heat exchanger; when the first port communicates with the second port, the first end port of the second heat exchanger communicates with the second port; when the first port communicates with the third port, the first end port of the third heat exchanger communicates with the third port; both the second heat exchanger and the third heat exchanger can realize throttling function through the first throttling device. As a result, the number of components of the thermal management system to be controlled is reduced, and the control method of the thermal management system is simplified.

DETAILED DESCRIPTION

Reference will now be made in detail to the exemplary embodiments, examples of which are illustrated in accompanying drawings. When the following description refers to the accompanying drawings, the same numerals in different drawings refer to the same or similar elements unless otherwise indicated. The embodiments described in the following exemplary implementations do not represent all implementations consistent with the present disclosure. Rather, they are merely examples of apparatuses and methods consistent with aspects of the present disclosure as recited in the appended claims.

The terms used in the present disclosure are only for the purpose of describing specific embodiments, and are not intended to limit the present disclosure. The singular forms of “a”, “said” and “the” described in the present disclosure and appended claims are also intended to include plural forms, unless the context clearly indicates otherwise.

It should be understood that “first”, “second” and similar words used in the specification and claims of the present disclosure do not indicate any order, quantity or importance, but are only used to distinguish different components. Similarly, similar words such as “a” or “an” do not mean a quantity limit, but mean that there is at least one. “A plurality of” means a quantity of two or more. Unless otherwise indicated, similar words such as “front”, “rear”, “lower” and/or “upper” are only for convenience of description, and are not limited to one position or one spatial orientation. Terms such as “including” or “comprising” and other similar words mean that the elements or components before “including” or “comprising” now cover the elements or components listed after “including” or “comprising” and their equivalents, and do not exclude other elements or components.

The thermal management system of the exemplary embodiments of the present disclosure will be described in detail below with reference to the accompanying drawings. In the case of no conflict, the features in the following embodiments and implementation manners may complement each other or be combined with each other.

The thermal management system of the present disclosure can be applied to equipment such as vehicles and ships that have relatively confined spaces and require thermal management. Optionally, the thermal management system of the present disclosure can be applied to electric vehicles. For ease of description, the following embodiments are described by taking the application to a vehicle as an example.

Figure 1:
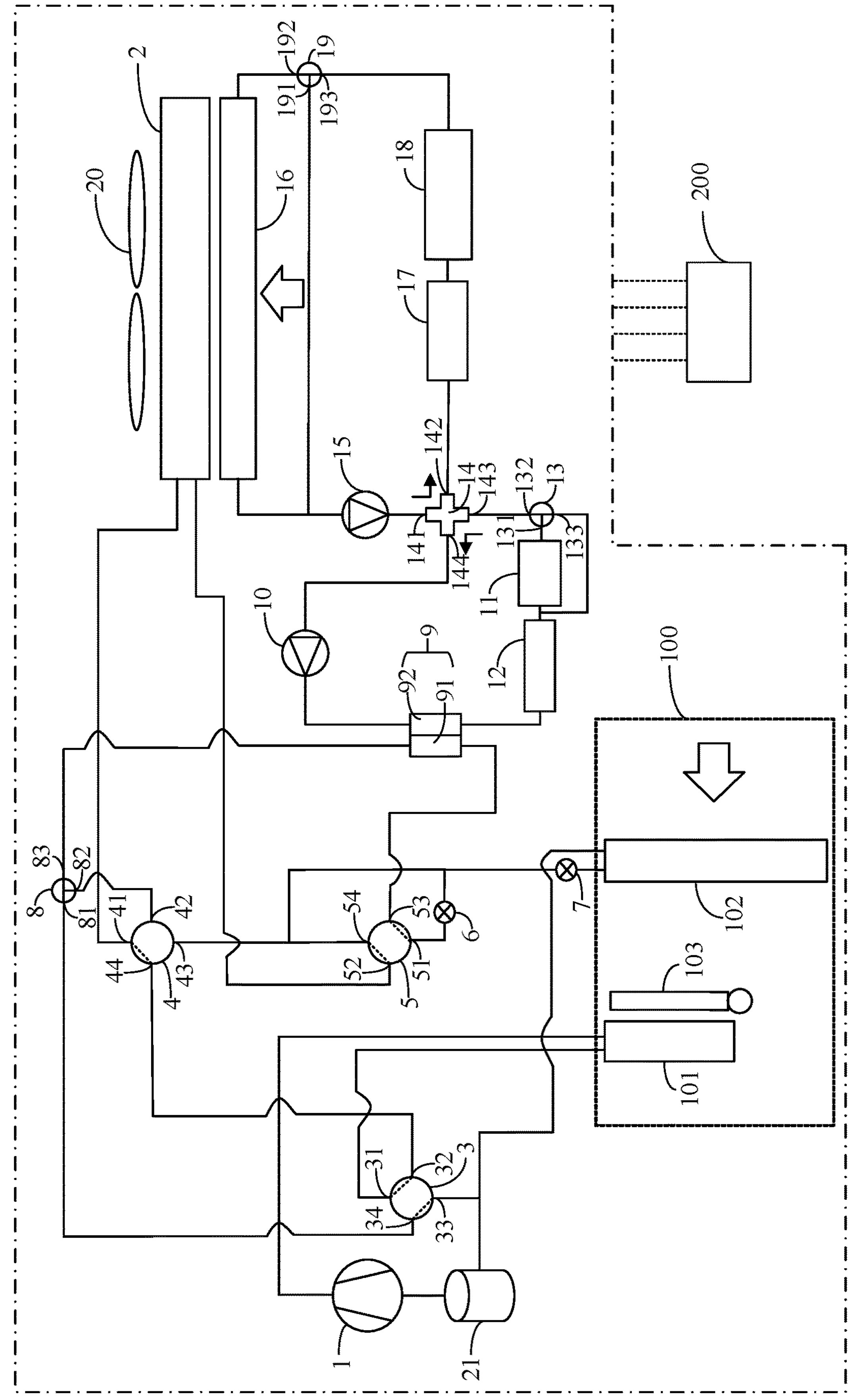
FIG. 1 is a structural schematic diagram of a thermal management system in an embodiment of the present disclosure.

According to a specific embodiment of the thermal management system of the present disclosure, as shown in FIG. 1, the thermal management system includes a compressor 1, a first heat exchanger 101, a second heat exchanger 2, a third heat exchanger 9, a fourth heat exchanger 102, a first throttling device 6, a second throttling device 7, a third flow direction switching device 3, a second flow direction switching device 4, a first flow direction switching device 5, a first multi-way device 8, a battery heat exchange device 11, a first pump 10, a heating device 12, an air conditioning box 100 and a damper 103.

The third heat exchanger 9 includes a first heat exchange portion 91 and a second heat exchange portion 92. The first heat exchange portion 91 and the second heat exchange portion 92 are capable of exchanging heat. Both the first heat exchange portion 91 and the second heat exchange portion 92 are provided with flow channels. The flow channels of the first heat exchange portion 91 and the flow channels of the second heat exchange portion 92 are isolated from each other and are not in fluid communication with each other. The third heat exchanger 9 may be a plate heat exchanger or a shell-and-tube liquid-cooled heat exchanger. When the refrigerant adopts high-pressure refrigerant (such as CO2 refrigerant), the third heat exchanger 9 adopts the shell-and-tube heat exchanger, which includes a plurality of microchannel flat tubes disposed side by side, two collecting pipes connected to opposite ends of the microchannel flat tubes, and a shell surrounding the microchannel flat tubes and located between the two collecting pipes. A loop in communication with the compressor 1 is a refrigerant loop. A loop in communication with the first pump 10 is a coolant loop. The flow channels of the first heat exchange portion 91 are configured to circulate refrigerant. The flow channels of the second heat exchange portion 92 are configured to circulate coolant. The refrigerant can be R134A or carbon dioxide or other heat exchange medium. The coolant can be water, oil and other substances capable of exchanging heat, or a mixture of water and ethylene glycol, or other mixed fluids capable of exchanging heat.

In the present disclosure, the heat exchangers capable of directly exchanging heat with the air flow of the passenger compartment are all located in the air conditioning box 100. The air conditioning box 100 has an internal circulation state and an external circulation state. In the internal circulation state, an inlet of the air conditioning box 100 communicates with the passenger compartment; an outlet of the air conditioning box 100 communicates with the passenger compartment; and the air in the passenger compartment is blown into the passenger compartment after exchanging heat in the air conditioning box 100. In the external circulation state, the inlet of the air conditioning box 100 communicates with an atmospheric environment; the outlet of the air conditioning box 100 communicates with the passenger compartment; and the air in the atmospheric environment is blown into the passenger compartment after exchanging heat in the air conditioning box 100.

Various components of the thermal management system are connected by pipelines to form two sub-systems, namely a refrigerant system and a coolant system. The refrigerant in the refrigerant system and the coolant in the coolant system are isolated from each other so as not to be in communication. Wherein the flow channels of the first heat exchange portion 91 are connected to the refrigerant system. The flow channels of the second heat exchange portion 92 are connected to the coolant system.

It should be explained that "the flow channels of the first heat exchange portion 91 are connected to the refrigerant system" mentioned here means that the refrigerant in the refrigerant system can flow into and out of the flow channels of the first heat exchange portion 91; the first heat exchange portion 91 can be connected with components in the refrigerant system through pipelines, and form a loop after being connected through the pipelines when the thermal management system is working. "The flow channels of the second heat exchange portion 92 are connected to the coolant system" mentioned here means that the coolant in the coolant system can flow into and out of the flow channels of the second heat exchange portion 92; the second heat exchange portion 92 can be connected with components in the coolant system through pipelines, and form a loop after being connected through the pipelines when the thermal management system is working.

In this embodiment, the refrigerant system includes: the compressor 1, the first heat exchanger 101, the second heat exchanger 2, the first heat exchange portion 91 of the third heat exchanger 9, the fourth heat exchanger 102, the first throttling device 6, the second throttling device 7, the third flow direction switching device 3, the second flow direction switching device 4, the first flow direction switching device 5, and a first multi-way device 8. The above-mentioned components may be connected directly, or may be indirectly connected through pipelines or valve components.

In this embodiment, the first heat exchanger 101 and the fourth heat exchanger 102 are disposed in the air conditioning box 100. Both the first heat exchanger 101 and the fourth heat exchanger 102 can directly exchange heat with the air flow of the passenger compartment. The fourth heat exchanger 102 is disposed on a windward side of the first heat exchanger 101. A damper 103 is provided between the first heat exchanger 101 and the fourth heat exchanger 102. The damper 103 is used to control the air volume flowing through the first heat exchanger 101. The damper 103 has an open state and a closed state. When the damper 103 is opened, the air can flow through the first heat exchanger 101. The first heat exchanger 101 is capable of exchanging heat with the air flow of the passenger compartment. By adjusting an opening degree of the damper 103, the air volume flowing through the first heat exchanger 101 is adjusted. When the damper 103 is closed, the air does not flow through the first heat exchanger 101. The second heat exchanger 2 and the third heat exchanger 9 are disposed outside the air conditioning box 100. The second heat exchanger 2 can exchange heat with the atmospheric environment. The third heat exchanger 9 can realize the heat exchange between the refrigerant and the coolant. The third heat exchanger 9 can be a plate heat exchanger or other liquid-cooled heat exchangers. The first heat exchanger 101, the second heat exchanger 2 and the fourth heat exchanger 102 can be air-cooled heat exchangers according to needs, which is not limited in the present disclosure.

In this embodiment, the third flow direction switching device 3 includes a ninth port 31, a tenth port 32, an eleventh port 33 and a twelfth port 34. The third flow direction switching device 3 has a first working way and a second working way. In the first working way, the ninth port 31 communicates with the tenth port 32; and the eleventh port 33 communicates with the twelfth port 34. In the second working way, the ninth port 31 communicates with the twelfth port 34; and the tenth port 32 communicates with the eleventh port 33. Optionally, the third flow direction switching device 3 may be a four-way valve, or a combination of multiple valve components.

The second flow direction switching device 4 includes a fifth port 41, a sixth port 42, a seventh port 43 and an eighth port 44. The second flow direction switching device 4 has a first working mode and a second working mode. In the first working mode, the fifth port 41 communicates with the sixth port 42; and the seventh port 43 communicates with the eighth port 44. In the second working mode, the fifth port 41 communicates with the eighth port 44; and the sixth port 42 is in communication with the seventh port 43 or not. It should be understood that, depending on the structural design of the second flow direction switching device 4, in the second working mode, the sixth port 42 and the seventh port 43 may or may not be communicated. In this embodiment, in the second working mode, the sixth port 42 is not in communication with the seventh port 43. Optionally, the second flow direction switching device 4 may be a four-way valve, or a combination of multiple valve components.

The first flow direction switching device 5 includes a first port 51, a second port 52, a third port 53 and a fourth port 54. The first flow direction switching device 5 has a first working state and a second working state. In the first working state, according to the requirements of the thermal management system, the first port 51 communicates with at least one of the second port 52 and the third port 53. In the second working state, the first port 51 communicates with the third port 53; and the second port 52 communicates with the fourth port 54. Optionally, the first flow direction switching device 5 may be a four-way valve, or a combination of multiple valve components.

The first multi-way device 8 includes a first connection port 81, a second connection port 82 and a third connection port 83. The first multi-way device 8 includes a working state and a non-working state. When the first multi-way device 8 is in the non-working state, the first connection port 81, the second connection port 82 and the third connection port 83 are not in communication with one another. When the first multi-way device 8 is in the working state, the first connection port 81 communicates with at least one of the second connection port 82 and the third connection port 83 according to the requirements of the thermal management system. Optionally, the first multi-way device 8 is a three-way valve or a combination of multiple valve components.

In the refrigerant system of this embodiment, an outlet of the compressor 1 is capable of communicating with an inlet of the first heat exchanger 101; an outlet of the first heat exchanger 101 is capable of communicating with the ninth port 31; the tenth port 32 is capable of communicating with the eighth port 44; the eleventh port 33 is capable of communicating with an inlet of the compressor 1; the twelfth port 34 is capable of communicating with the first connection port 81. The fifth port 41 is capable of communicating with the second end port of the second heat exchanger 2. The sixth port 42 is capable of communicating with the second connection port 82; the seventh port 43 is capable of communicating with a second end port of the first throttling device 6 and an inlet of the second throttling device 7. The first port 51 is capable of communicating with the first end port of the first throttling device 6; the second port 52 is capable of communicating with a first end port of the second heat exchanger 2; the third port 53 is capable of communicating with a first end port of the first heat exchange portion 91; the fourth port 54 is capable of communicating with the second end port of the first throttling device 6 and the inlet of the second throttling device 7. A second end port of the first heat exchange portion 91 is capable of communicating with the third connection port 83. An outlet of the second throttling device 7 is capable of communicating with an inlet of the fourth heat exchanger 102. An outlet of the fourth heat exchanger 102 is capable of communicating with the inlet of the compressor 1. The first throttling device 6 has at least a throttling state and a cut-off state. The first throttling device 6 has a bidirectional throttling function. The first throttling device 6 can choose a two-way throttling valve or a combination of multiple valve components to realize the functions of bidirectional throttling and cut-off, which is not limited in this application. The second throttling device 7 has at least a throttling state, a conducting state and a cut-off state. Optionally, the second throttling device 7 is an electronic expansion valve.

Besides, referring to FIG. 1 to FIG. 16, a gas-liquid separator 21 may be provided before the inlet of the compressor 1 in order to separate the gas-liquid of the refrigerant before entering the compressor 1. The liquid refrigerant is stored in the gas-liquid separator 21, while the low-temperature and low-pressure gaseous refrigerant enters the compressor 1 and is recompressed to realize recycling of the refrigerant and reduce the possibility of liquid shock of the compressor 1. Of course, for some new compressors 1, the gas-liquid separator 21 may not be provided. For the convenience of description, the following thermal management system will be described without providing the gas-liquid separator 21 as an example.

In this embodiment, the coolant system includes: the first pump 10, a second pump 15, the battery heat exchange device 11, a motor heat exchange device 18, the heating device 12, the second heat exchange portion 92 of the third heat exchanger 9, a fifth heat exchanger 16, a second multi-way device 13, a third multi-way device 19 and a fourth multi-way device 14. The above-mentioned components may be connected directly, or may be indirectly connected through pipelines or valve components.

The fifth heat exchanger 16 exchanges heat with the atmospheric environment, and the fifth heat exchanger 16 can be an air-cooled heat exchanger according to needs, which is not limited in this application. The battery heat exchange device 11 is used to realize the heat exchange between the battery assembly and the coolant, so as to perform thermal management on the battery assembly. The motor heat exchange device 18 is used to realize the heat exchange between the motor assembly and the coolant, so as to perform thermal management on the motor assembly. The heating device 12 is used to heat the coolant, and is turned on or off according to the requirements of the thermal management system. Optionally, the first pump 10 and the second pump 15 are water pumps, which are used to provide power for the circulating flow of the coolant loop.

The coolant system includes a first bypass branch and a second bypass branch. The first bypass branch is connected in parallel with the battery heat exchange device 11. One end of the first bypass branch and one end of the battery heat exchange device 11 is capable of communicating with the second multi-way device 13, respectively, and the battery heat exchange device 11 is selectively connected to the coolant loop through the second multi-way device 13. Alternatively, the first bypass branch is selected to be connected to the coolant loop. The second bypass branch is connected in parallel with the fifth heat exchanger 16. One end of the second bypass branch and one end of the fifth heat exchanger 16 is capable of communicating with the third multi-way device 19, respectively, and the fifth heat exchanger 16 is selectively connected to the coolant loop through the third multi-way device 19. Alternatively, the second bypass branch is selected to be connected to the coolant loop. Optionally, each of the first bypass branch and the second bypass branch is a pipe.

The second multi-way device 13 includes a fourth connection port 131, a fifth connection port 132 and a sixth connection port 133. According to the requirements of the thermal management system, the fifth connection port 132 communicates with at least one of the sixth connection port 133 and the fourth connection port 131. The third multi-way device 19 includes a seventh connection port 191, an eighth connection port 192 and a ninth connection port 193. According to the requirements of the thermal management system, the ninth connection port 193 communicates with at least one of the seventh connection port 191 and the eighth connection port 192. Optionally, the second multi-way device 13 is a three-way valve or a combination of multiple valve components. Optionally, the third multi-way device 19 is a three-way valve or a combination of multiple valve components.

The fourth multi-way device 14 includes a tenth connection port 141, an eleventh connection port 142, a twelfth connection port 143 and a thirteenth connection port 144. The fourth multi-way device 14 has a first connection state and a second connection state. In the first connection state, the tenth connection port 141 communicates with the eleventh connection port 142; and the twelfth connection port 143 communicates with the thirteenth connection port 144. In the second connection state, the tenth connection port 141 communicates with the thirteenth connection port 144; and the eleventh connection port 142 communicates with the twelfth connection port 143. Optionally, the fourth multi-way device 14 is a four-way valve or a combination of multiple valve components.

The coolant system includes a first pipeline and a second pipeline. One port of the first pipeline is capable of communicating with the thirteenth connection port 144, and the other port of the first pipeline is capable of communicating with the twelfth connection port 143. One port of the second pipeline is capable of communicating with the tenth connection port 141, and the other port of the second pipeline communicates with the eleventh connection port 142. When the fourth multi-way device 14 is in the first connection state, the first pipeline forms a coolant loop through the fourth multi-way device 14 itself; the second pipeline forms a coolant loop through the fourth multi-way device 14 itself. The loop formed by the first pipeline is not in communication with the loop formed by the second pipeline. When the fourth multi-way device 14 is in the second connection state, the first pipeline and the second pipeline are communicated in series through the fourth multi-way device 14 to form a coolant loop; and the first pipeline is capable of communicating with the second pipeline through the fourth multi-way device 14.

In this embodiment, the first pipeline includes the first pump 10, the second heat exchange portion 92, the heating device 12, the battery heat exchange device 11, the second multi-way device 13 and the first bypass branch. The above-mentioned components may be connected directly, or may be indirectly connected through pipelines or valve components. The second pipeline includes the second pump 15, the motor heat exchange device 18, the fifth heat exchanger 16, the third multi-way device 19 and the second bypass branch. The above-mentioned components may be connected directly, or may be indirectly connected through pipelines or valve components.

In the coolant system of this embodiment, the first pump 10, the second heat exchange portion 92 and the heating device 12 are connected in sequence. An inlet of the first pump 10 is capable of communicating with the thirteenth connection port 144; the fifth connection port 132 is capable of communicating with the twelfth connection port 143. One port of the battery heat exchange device 11 is capable of communicating with the fourth connection port 131, and the other port of the battery heat exchange device 11 is capable of communicating with the heating device 12. One port of the first bypass branch is capable of communicating with the sixth connection port 133, and the other port of the first bypass branch is capable of communicating with the heating device 12. One port of the motor heat exchange device 18 is capable of communicating with the eleventh connection port 142, and the other port of the motor heat exchange device 18 is capable of communicating with the ninth connection port 193. One port of the second bypass branch is capable of communicating with the inlet of the second pump 15, and the other port of the second bypass branch is capable of communicating with the seventh connection port 191. One port of the fifth heat exchanger 16 is capable of communicating with the inlet of the second pump 15, and the other port of the fifth heat exchanger 16 is capable of communicating with the eighth connection port 192. An outlet of the second pump 15 is capable of communicating with the tenth connection port 141.

In some embodiments, the second heat exchanger 2 and the fifth heat exchanger 16 constitute a front-end module. The front-end module can be disposed adjacent to a front air intake grille of the vehicle, which is beneficial for heat exchange with the atmospheric environment. Optionally, the fifth heat exchanger 16 is disposed on a windward side of the second heat exchanger 2. Specifically, the front-end module further includes a fan assembly 20. The fan assembly 20 makes the air flow through a surface of the fifth heat exchanger 16 and a surface of the second heat exchanger 2 in sequence, which can improve the heat exchange capacity of the second heat exchanger 2 and the fifth heat exchanger 16.

In some other embodiments, referring to FIG. 1 to FIG. 16, the second pipeline further includes other devices 17 to be cooled, such as inverters, chargers, and the like. The device 17 disposed on the second pipeline can dissipate heat through the fifth heat exchanger 16, and can also be cooled through the second heat exchange portion 92, so as to improve the thermal management capability of the components of the vehicle.

Figure 2:
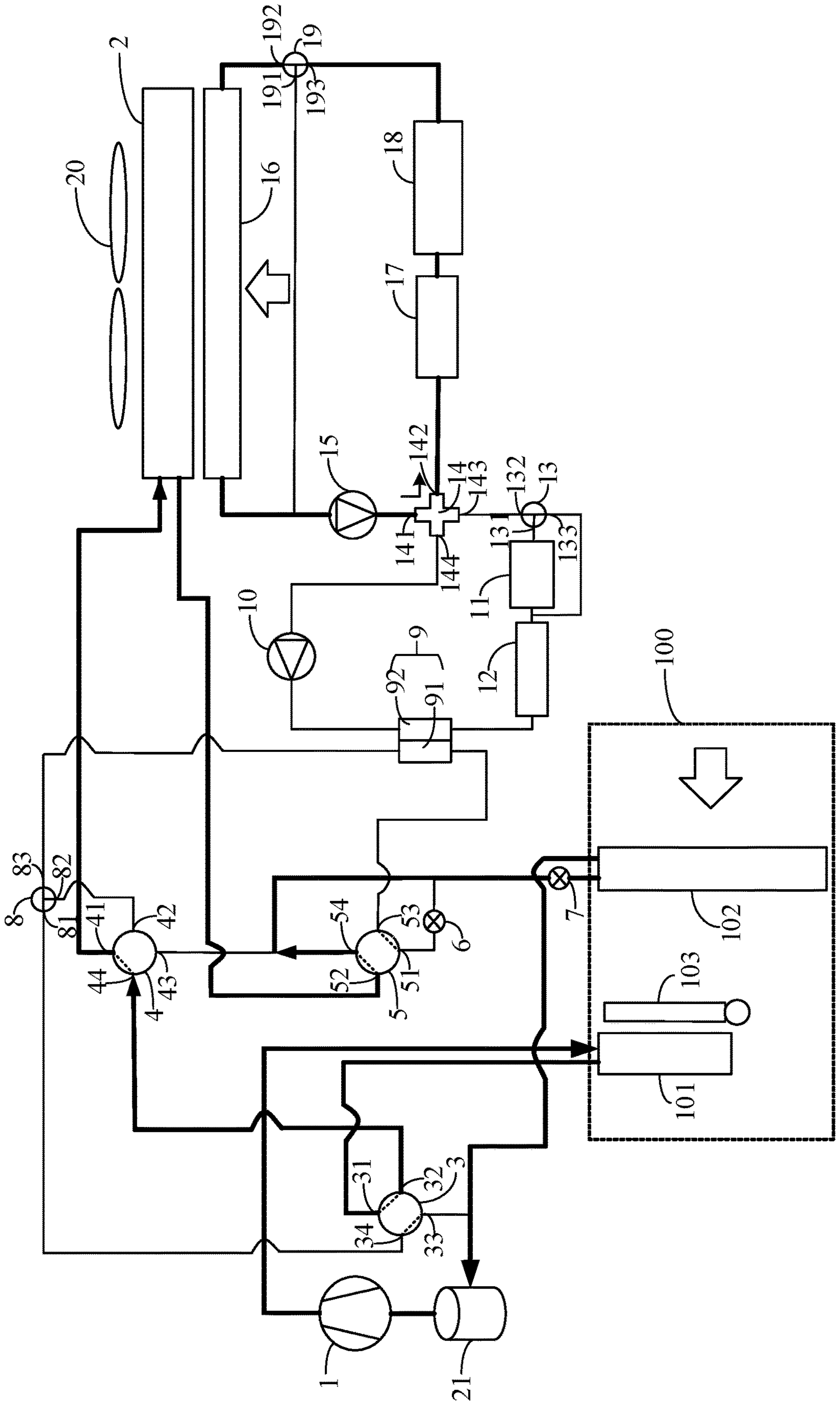
FIG. 2 is a schematic diagram of a single cooling mode of a thermal management system in an embodiment of the present disclosure.
Figure 3:
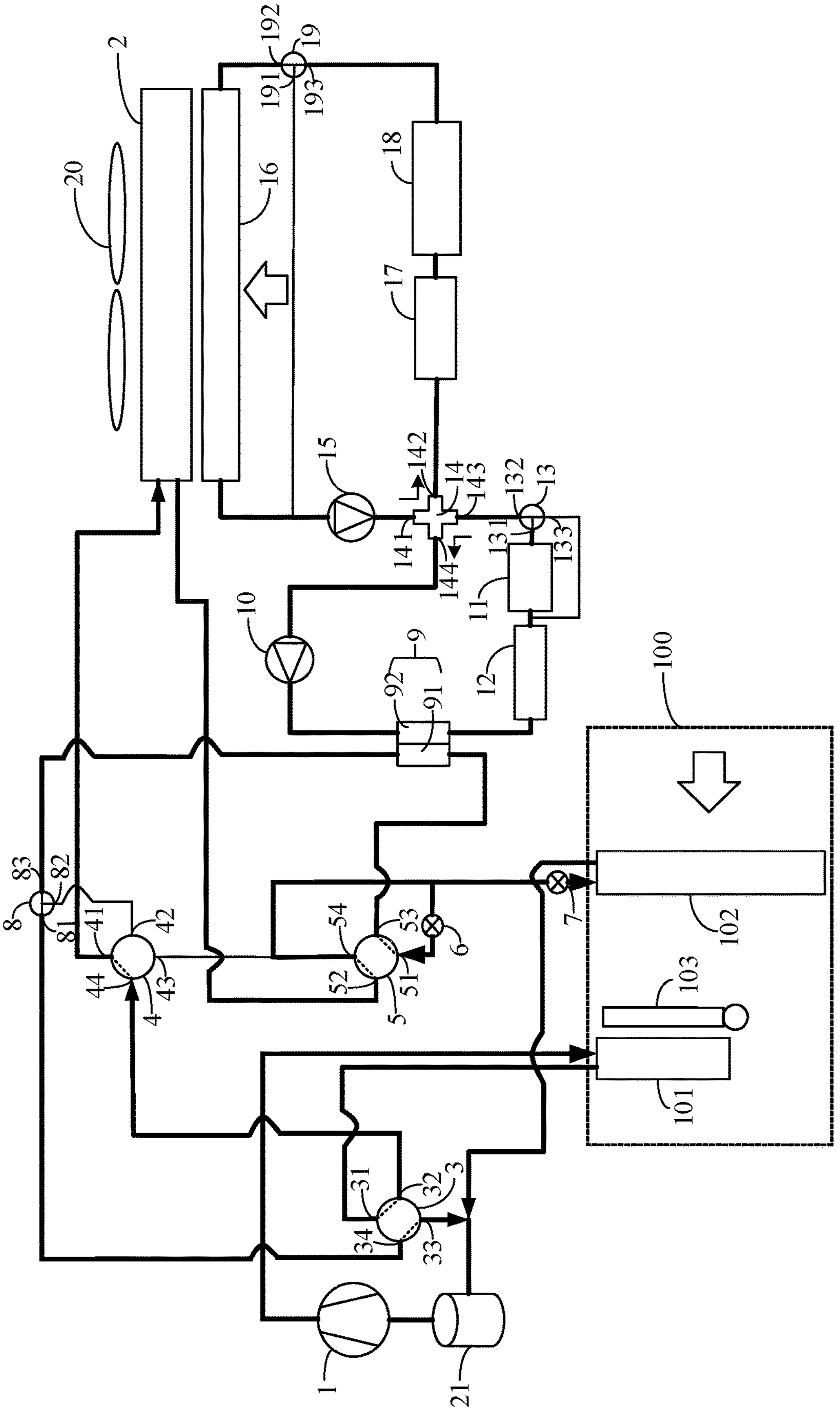
FIG. 3 is a schematic diagram of a hybrid cooling mode of a thermal management system in an embodiment of the present disclosure.

Referring to FIG. 1 to FIG. 3, the thermal management system includes cooling modes. When the environmental temperature is high, the passenger compartment needs to be cooled and/or the battery assembly needs to be cooled, the cooling mode is turned on. At this time, the damper 103 is closed; the air does not flow through the first heat exchanger 101; and the first heat exchanger 101 does not participate in heat exchange. The cooling modes include a single cooling mode, a battery single cooling mode and a hybrid cooling mode. Among them, the single cooling mode can realize the single cooling of the passenger compartment; the battery single cooling mode can realize the single cooling of the battery assembly; and the hybrid cooling mode can realize the cooling of the passenger compartment and the cooling of the battery assembly.

In mid-to-high temperature and high-temperature environments in summer, when the passenger compartment has cooling needs and the battery has no heat management needs, the thermal management system is in the single cooling mode. Referring to FIG. 2, in the single cooling mode, the third flow direction switching device 3 is in the first working way; the second flow direction switching device 4 is in the second working mode; the first flow direction switching device 5 is in the second working state; the first throttling device 6 is in the cut-off state; the second throttling device 7 is in the throttling state; the first multi-way device 8 is in the non-working state; the first pump 10 stops working; the second pump 15 provides power for the coolant loop; the second multi-way device 13 is in the non-working state; the eighth connection port 192 of the third multi-way device 19 communicates with the ninth connection port 193; and the fourth multi-way device 14 is in the first connection state.

In the coolant system, the second pump 15, the fourth multi-way device 14, the motor heat exchange device 18, the third multi-way device 19, the fifth heat exchanger 16, and the second pump 15 are sequentially communicated to form a coolant loop. Through the circulating flow of the coolant, the heat of the motor assembly is taken to the fifth heat exchanger 16 and released into the atmospheric environment, thereby realizing the cooling of the motor assembly.

In the refrigerant system, the compressor 1, the first heat exchanger 101, the third flow direction switching device 3, the second flow direction switching device 4, the second heat exchanger 2, the first flow direction switching device 5, the second throttling device 7, the fourth heat exchanger 102 and the compressor 1 are communicated in sequence to form a refrigerant loop. The second heat exchanger 2 functions as a condenser. The fourth heat exchanger 102 functions as an evaporator.

Specifically, referring to FIG. 2, in the single cooling mode, the compressor 1 compresses the low-temperature and low-pressure gaseous refrigerant into a high-temperature and high-pressure gaseous refrigerant; the high-temperature and high-pressure refrigerant flows through the first heat exchanger 101 without heat exchange; after flowing through the third flow direction switching device 3 and the second flow direction switching device 4, the high-temperature and high-pressure refrigerant exchanges heat with the atmospheric environment in the second heat exchanger 2. The refrigerant releases heat, which is carried by the air flow to the outside environmental air. The refrigerant undergoes a phase change and condenses into a liquid or gas-liquid two-phase refrigerant. The refrigerant flows out of the second heat exchanger 2. After the refrigerant flows through the first flow direction switching device 5, it is throttled by the second throttling device 7, and the temperature and pressure are lowered to become a low-temperature and low-pressure refrigerant. The low-temperature and low-pressure refrigerant enters the fourth heat exchanger 102 and absorbs the heat of the air around in the fourth heat exchanger 102 so as to reduce the temperature of the air around the fourth heat exchanger 102. Under the action of the air flow, cold air enters grille air ducts (not shown in the drawings), and is sent into the passenger compartment so as to reduce the temperature of the passenger compartment and realize the function of cooling the passenger compartment. The refrigerant undergoes a phase change and most of it evaporates into a low-temperature and low-pressure gaseous refrigerant, which flows back into the compressor 1, and circulates in this way.

In the single cooling mode, when the required cooling temperature of the passenger compartment is set to be high, that is, when air mixing is required, the damper 103 can be opened at a certain angle to allow the air cooled by the fourth heat exchanger 102 to flow through the first heat exchanger 101. After flowing through the first heat exchanger 101, the temperature of the air increases, so that the temperature of the air sent into the passenger compartment is more appropriate.

In mid-to-high temperature and high-temperature environments in summer, when the passenger compartment and the battery assembly both have cooling needs, the thermal management system is in the hybrid cooling mode. Referring to FIG. 3, in the hybrid cooling mode, the third flow direction switching device 3 is in the first working way; the second flow direction switching device 4 is in the second working mode; the first flow direction switching device 5 is in the second working state; the first throttling device 6 is in the throttling state; the second throttling device 7 is in the throttling state; the first connection port 81 of the first multi-way device 8 communicates with the third connection port 83; the fourth connection port 131 of the second multi-way device 13 communicates with the fifth connection port 132; the eighth connection port 192 of the third multi-way device 19 communicates with the ninth connection port 193; the fourth multi-way device 14 is in the first connection state; the first pump 10 and the second pump 15 provides power to the coolant loops, respectively; the heating device 12 is not turned on and is only used as a pipeline.

In the coolant system, the first pump 10, the second heat exchange portion 92, the heating device 12, the battery heat exchange device 11, the second multi-way device 13, the fourth multi-way device 14 and the first pump 10 are communicated in sequence to form a coolant loop; and the battery assembly is cooled by the second heat exchange portion 92. The second pump 15, the fourth multi-way device 14, the motor heat exchange device 18, the third multi-way device 19, the fifth heat exchanger 16 and the second pump 15 are communicated in sequence to form another coolant loop; and the motor assembly is cooled by the fifth heat exchanger 16. Optionally, when the motor assembly cannot be cooled by the fifth heat exchanger 16, the fourth multi-way device 14 may be set to be in the second connection state; and the third multi-way device 19 is adjusted so that the seventh connection port 191 communicates with the ninth connection port 193, so that the motor assembly and the battery assembly are cooled by the second heat exchange portion 92.

In the refrigerant system, the compressor 1, the first heat exchanger 101, the third flow direction switching device 3, the second flow direction switching device 4, the second heat exchanger 2, the first flow direction switching device 5, the second throttling device 7, the fourth heat exchanger 102 and the compressor 1 are communicated in sequence to form a refrigerant loop; and the compressor 1, the first heat exchanger 101, the third flow direction switching device 3, the second flow direction switching device 4, the second heat exchanger 2, the first flow direction switching device 5, the first throttling device 6, the first flow direction switching device the first heat exchange portion 91, the first multi-way device 8, the third flow direction switching device 3 and the compressor 1 are communicated in sequence to form a refrigerant loop. The second heat exchanger 2 functions as a condenser. The third heat exchanger 9 and the fourth heat exchanger 102 function as evaporators.

Specifically, referring to FIG. 3, in the hybrid cooling mode, compared with the single cooling mode, after the refrigerant flows through the first flow direction switching device 5 for the first time, it is divided into two paths. One path enters the fourth heat exchanger 102 after being throttled by the second throttling device 7, the refrigerant absorbs the heat of the air around the fourth heat exchanger 102 to achieve the function of cooling the passenger compartment. After being throttled by the first throttling device 6, the other path flows through the first flow direction switching device 5 again and then enters the first heat exchange portion 91. In the third heat exchanger 9, the refrigerant in the first heat exchange portion 91 of the third heat exchanger 9 exchanges heat with the coolant in the second heat exchange portion 92. The temperature of the coolant is reduced, and the function of cooling the battery assembly is realized through the circulating flow of the coolant. The refrigerant flowing out of the fourth heat exchanger 102 flows back into the compressor 1. The refrigerant flowing out of the first heat exchange portion 91 flows through the first multi-way device 8 and the third flow direction switching device 3 in sequence, and then flows back into the compressor 1, and circulates in this way. In some embodiments, the refrigerant flowing out of the fourth heat exchanger 102 and the refrigerant flowing out of the first heat exchange portion 91 may flow together, and then flow back to the compressor 1 together.

Figure 4:
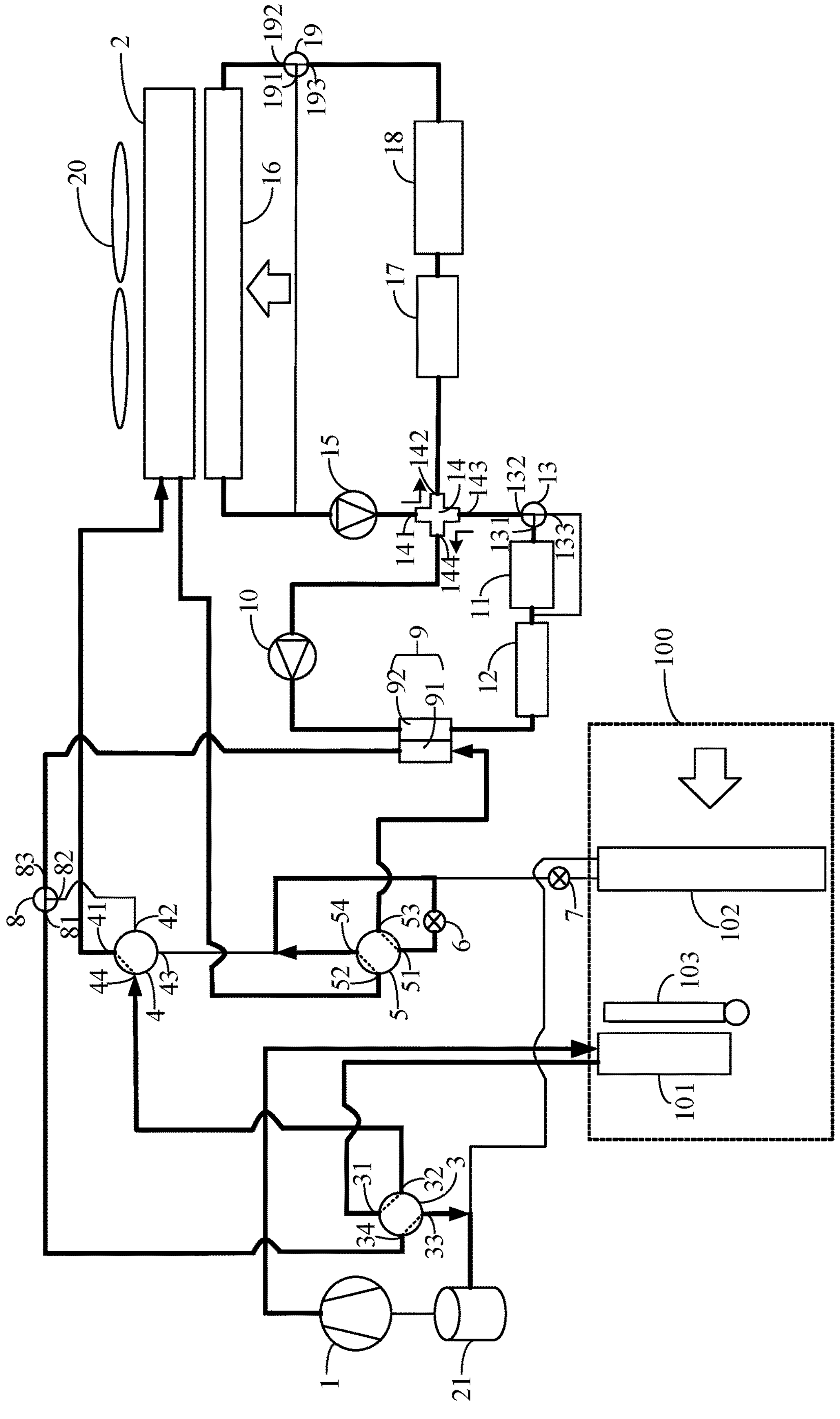
FIG. 4 is a schematic diagram of a battery single cooling mode of a thermal management system in an embodiment of the present disclosure.

In the middle and high temperature charging and high temperature driving conditions in summer, when the battery assembly has cooling requirements and the passenger compartment has no cooling requirements, the thermal management system is in the battery single cooling mode. Referring to FIG. 4, in the battery single cooling mode, the third flow direction switching device 3 is in the first working way; the second flow direction switching device 4 is in the second working mode; the first flow direction switching device 5 is in the second working state; the first throttling device 6 is in the throttling state; the second throttling device 7 is in the cut-off state; the first connection port 81 of the first multi-way device 8 communicates with the third connection port 83. In battery single cooling mode, the working principle of the coolant system is the same as that in the hybrid cooling mode. For details, please refer to the related description of the hybrid cooling mode, which will not be repeated here.

In the refrigerant system, the compressor 1, the first heat exchanger 101, the third flow direction switching device 3, the second flow direction switching device 4, the second heat exchanger 2, the first flow direction switching device 5, the first throttling device 6, the first flow direction switching device 5, the first heat exchange portion 91, the first multi-way device 8, the third flow direction switching device 3 and the compressor 1 are communicated in sequence to form a refrigerant loop. The second heat exchanger 2 functions as a condenser, and the third heat exchanger 9 functions as an evaporator.

Specifically, referring to FIG. 4, in the battery single cooling mode, compared with the single cooling mode, the refrigerant flows through the first flow direction switching device 5 and then is throttled by the first throttling device 6. Then, the refrigerant flows through the first flow direction switching device 5 again and then enters the first heat exchange portion 91. The refrigerant in the first heat exchange portion 91 of the third heat exchanger 9 exchanges heat with the coolant in the second heat exchange portion 92. The temperature of the coolant is reduced, and the function of cooling the battery assembly is realized through the circulating flow of the coolant. The refrigerant flowing out of the first heat exchange portion 91 flows through the first multi-way device 8 and the third flow direction switching device 3 in sequence, and then flows back into the compressor 1, and circulates in this way.

Under some working conditions, the heat exchange capacity of the second heat exchanger 2 may be insufficient. When it is confirmed that there is no one in the passenger compartment, the damper 103 can be opened, and the air conditioning box 100 can be set to an external circulation state. At this time, both the first heat exchanger 101 and the second heat exchanger 2 function as condensers, thereby ensuring the cooling capacity of the third heat exchanger 9.

Referring to FIG. 5 to FIG. 8, the thermal management system includes heating modes. When the environmental temperature is low and the passenger compartment needs heating, the heating mode is turned on. At this time, the damper 103 is opened, and the first heat exchanger 101 is used as a condenser. The heating modes include a single heating mode, a waste heat recovery mode, a mixed heating mode and a rapid heating mode. The single heating mode, the waste heat recovery mode, the mixed heating mode and the rapid heating mode can all meet the heating needs of the passenger compartment. Wherein, in the single heating mode, only the second heat exchanger 2 is used as an evaporator. In the waste heat recovery mode and the rapid heating mode, only the third heat exchanger 9 is used as an evaporator. In the mixed heating mode, both the second heat exchanger 2 and the third heat exchanger 9 are used as evaporators.

Figure 5:
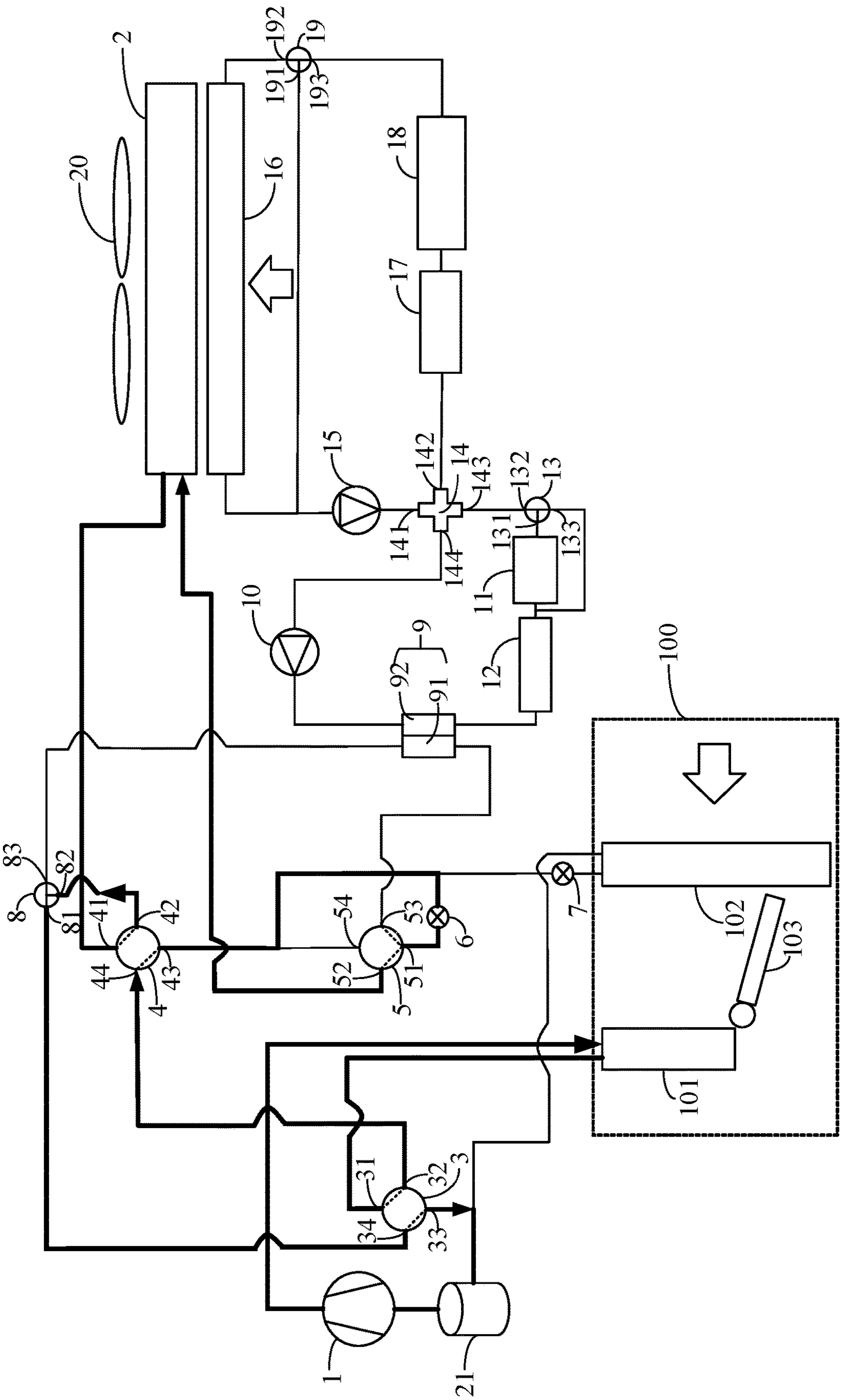
FIG. 5 is a schematic diagram of a single heating mode of a thermal management system in an embodiment of the present disclosure.

In a low-temperature and low-humidity environment, when there is a heating demand for the passenger compartment and no thermal management demand for the battery assembly, the thermal management system is in the single heating mode. Referring to FIG. 5, in the single heating mode, the third flow direction switching device 3 is in the first working way; the second flow direction switching device 4 is in the first working mode; the first flow direction switching device 5 is in the first working state; the first port 51 is only in communication with the second port 52; the first throttling device 6 is in the throttling state; the second throttling device 7 is in the cut-off state; the first connection port 81 of the first multi-way device 8 communicates with the second connection port 82.

In the coolant system, the state of the coolant system is adjusted according to the thermal management requirements of the battery assembly and the motor assembly. When the battery assembly does not need to be heated and the motor assembly does not need to dissipate heat, the first pump 10 and the second pump 15 are turned off, and the coolant system is not working. When only the battery assembly needs to be heated, the fourth multi-way device 14 can be in the first connection state; the first pump 10, the second heat exchange portion 92, the heating device 12, the battery heat exchange device 11, the second multi-way device 13, the fourth multi-way device 14 and the first pump 10 are communicated in sequence to form a coolant loop. Wherein, the heating device 12 is switched on for heating the coolant; the first pump 10 provides power to the coolant loop; the second pump 15 is turned off; and the battery assembly is heated by the heating device 12. When the battery assembly needs to be heated and the motor assembly has residual heat, the fourth multi-way device 14 can also be in the second connection state; the fourth connection port 131 of the second multi-way device 13 communicates with the fifth connection port 132; the seventh connection port 191 of the third multi-way device 19 communicates with the ninth connection port 193; and at least one of the first pump 10 and the second pump 15 provides power to coolant loop. The first pump 10, the second heat exchange portion 92, the heating device 12, the battery heat exchange device 11, the second multi-way device 13, the fourth multi-way device 14, the motor heat exchange device 18, the third multi-way device 19, the second pump 15, the fourth multi-way device 14 and the first pump 10 are communicated in sequence to form a coolant loop. The residual heat of the motor assembly is used to heat the battery assembly through the circulating of the coolant. If the residual heat of the motor assembly is not enough, the heating device 12 can also be turned on for auxiliary heat.

In the refrigerant system, the compressor 1, the first heat exchanger 101, the third flow direction switching device 3, the second flow direction switching device 4, the first throttling device 6, the first flow direction switching device 5, the second heat exchanger 2, the second flow direction switching device 4, the first multi-way device 8, the third flow direction switching device 3 and the compressor 1 are communicated in sequence to form a refrigerant loop. The first heat exchanger 101 functions as a condenser, and the second heat exchanger 2 functions as an evaporator.

Specifically, referring to FIG. 5, in the single heating mode, the compressor 1 compresses the low-temperature and low-pressure gaseous refrigerant into a high-temperature and high-pressure gaseous refrigerant. The high-temperature and high-pressure refrigerant flows into the first heat exchanger 101. The refrigerant in the first heat exchanger 101 heats the air around, thereby increasing the temperature of the air around the first heat exchanger 101. Under the action of the air flow, the hot air enters the grille air ducts (not shown in the drawings) and is sent into the passenger compartment to increase the temperature of the passenger compartment so as to realize the heating function of the passenger compartment. The refrigerant flows out of the first heat exchanger 101, flows through the third flow direction switching device 3 and the second flow direction switching device 4 in sequence, and is throttled by the first throttling device 6 to reduce the temperature and pressure so as to become a low-temperature and low-pressure refrigerant. The low-temperature and low-pressure refrigerant flows through the first flow direction switching device 5 and then enters the second heat exchanger 2, where it exchanges heat with the atmospheric environment. The refrigerant undergoes a phase change and most of it evaporates into a low-temperature and low-pressure gaseous refrigerant. The refrigerant flowing out of the second heat exchanger 2 sequentially flows through the second flow direction switching device 4, the first multi-way device 8 and the third flow direction switching device 3, and then flows back into the compressor 1, and circulates in this way. In a low-temperature and low-humidity environment, the second heat exchanger 2 is not prone to frost and is suitable for use as an evaporator. The second heat exchanger 2 is used as an evaporator to make full use of the heat of the atmospheric environment, which is beneficial for energy saving.

Figure 6:
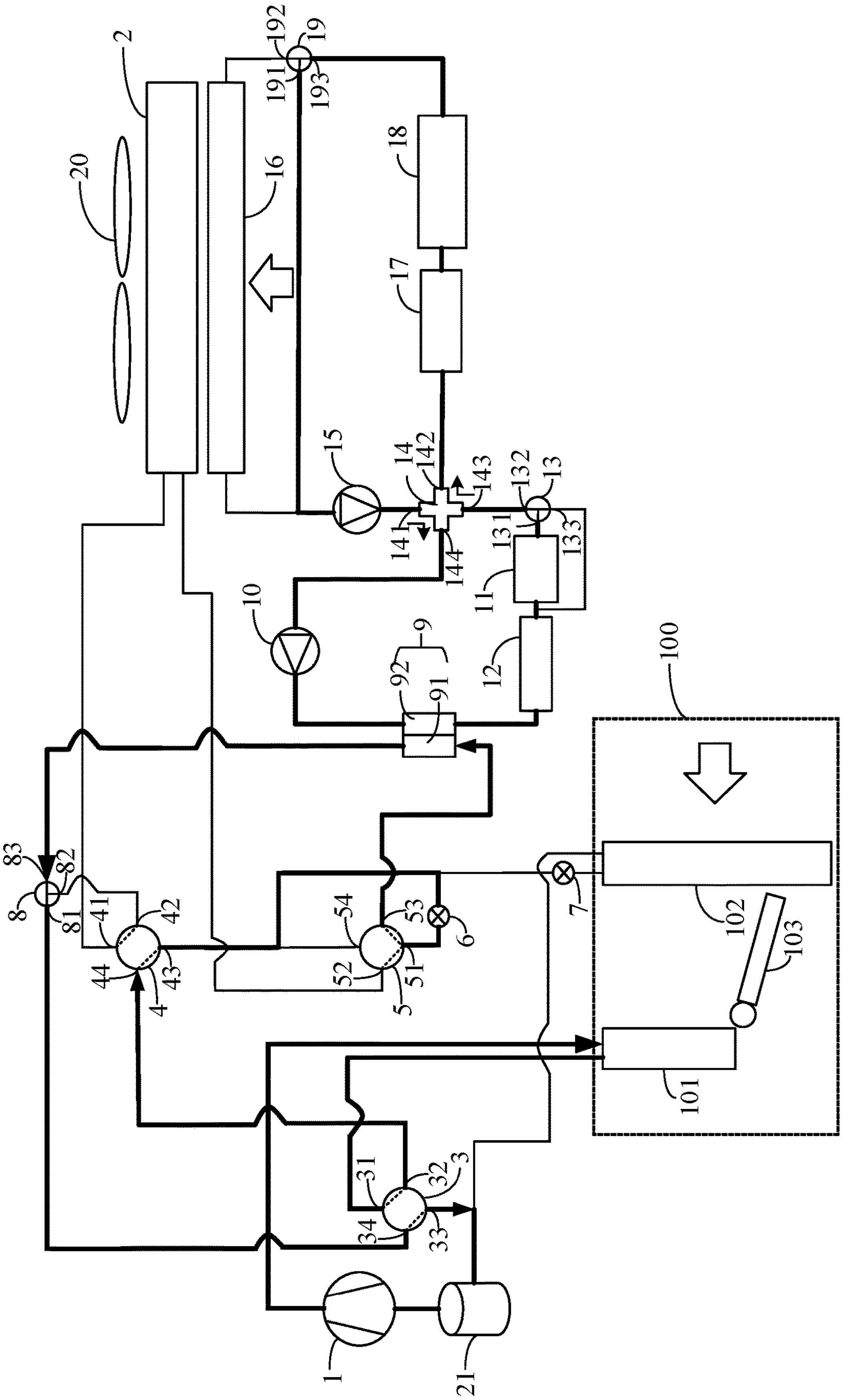
FIG. 6 is a schematic diagram of a waste heat recovery mode of a thermal management system in an embodiment of the present disclosure.

In a low-temperature and high-humidity environment, when there is a heating demand in the passenger compartment and at least one of the battery assembly and the motor assembly has residual heat, the thermal management system is in the waste heat recovery mode. Referring to FIG. 6, in the waste heat recovery mode, the third flow direction switching device 3 is in the first working way; the second flow direction switching device 4 is in the first working mode; the first flow direction switching device 5 is in the first working state; the first port 51 is only in communication with the third port 53; the first throttling device 6 is in the throttling state; the second throttling device 7 is in the cut-off state; the first connection port 81 of the first multi-way device 8 communicates with the third connection port 83; the fourth connection port 131 of the second multi-way device 13 communicates with the fifth connection port 132; the seventh connection port 191 of the third multi-way device 19 communicates with the ninth connection port 193; the fourth multi-way device 14 is in the second connection state; and at least one of the first pump 10 and the second pump 15 provides power to the coolant loop.

In the coolant system, the first pump 10, the second heat exchange portion 92, the heating device 12, the battery heat exchange device 11, the second multi-way device 13, the fourth multi-way device 14, the motor heat exchange device 18, the third multi-way device 19, the second pump 15, the fourth multi-way device 14 and the first pump 10 are communicated in sequence to form a coolant loop. Through the circulating of the coolant, the second heat exchange portion 92 recovers the waste heat of the battery assembly and the motor assembly, and at the same time reduces the temperature of the battery assembly and the motor assembly, so that the battery assembly and the motor assembly are at an appropriate temperature. According to the heat management requirements of the battery assembly at this time, an opening ratio of the second multi-way device 13 can be adjusted so that the fourth connection port 131 communicates with the fifth connection port 132 and the sixth connection port 133. Part of the coolant flows through the first bypass branch without exchanging heat with the battery assembly; or the fifth connection port 132 is only communicated with the sixth connection port 133, and the coolant does not exchange heat with the battery assembly.

In the refrigerant system, the compressor 1, the first heat exchanger 101, the third flow direction switching device 3, the second flow direction switching device 4, the first throttling device 6, the first flow direction switching device 5, the first heat exchange portion 91, the first multi-way device 8, the third flow direction switching device 3 and the compressor 1 are communicated in sequence to form a refrigerant loop. The first heat exchanger 101 functions as a condenser, and the third heat exchanger 9 functions as an evaporator.

Specifically, referring to FIG. 6, in the waste heat recovery mode, the compressor 1 compresses the low-temperature and low-pressure gaseous refrigerant into a high-temperature and high-pressure gaseous refrigerant. The high-temperature and high-pressure refrigerant flows into the first heat exchanger 101. The refrigerant in the first heat exchanger 101 heats the air around, thereby increasing the temperature of the air around the first heat exchanger 101. Under the action of the air flow, the hot air enters the grille air ducts (not shown in the drawings) and is sent into the passenger compartment to increase the temperature of the passenger compartment so as to realize the heating function of the passenger compartment. The refrigerant flows out of the first heat exchanger 101, flows through the third flow direction switching device 3 and the second flow direction switching device 4 in sequence, and is throttled by the first throttling device 6 to reduce the temperature and pressure so as to become a low-temperature and low-pressure refrigerant. The low-temperature and low-pressure refrigerant flows through the first flow direction switching device 5 and then enters the first heat exchange portion 91. The refrigerant in the first heat exchange portion 91 of the third heat exchanger 9 exchanges heat with the coolant in the second heat exchange portion 92. The refrigerant undergoes a phase change and most of it evaporates into a low-temperature and low-pressure gaseous refrigerant. The refrigerant flowing out of the first heat exchange portion 91 flows through the first multi-way device 8 and the third flow direction switching device 3 in sequence, and then flows back into the compressor 1, and circulates in this way. In the environment of low temperature and high humidity, the second heat exchanger 2 is prone to frost and is not suitable for use as an evaporator. The third heat exchanger 9 is used as an evaporator to recycle the residual heat of the motor assembly and the battery assembly, so as to realize the function of waste heat recovery while preventing frosting, which is beneficial for energy saving and improving the problem of frosting in the second heat exchanger 2.

Figure 7:
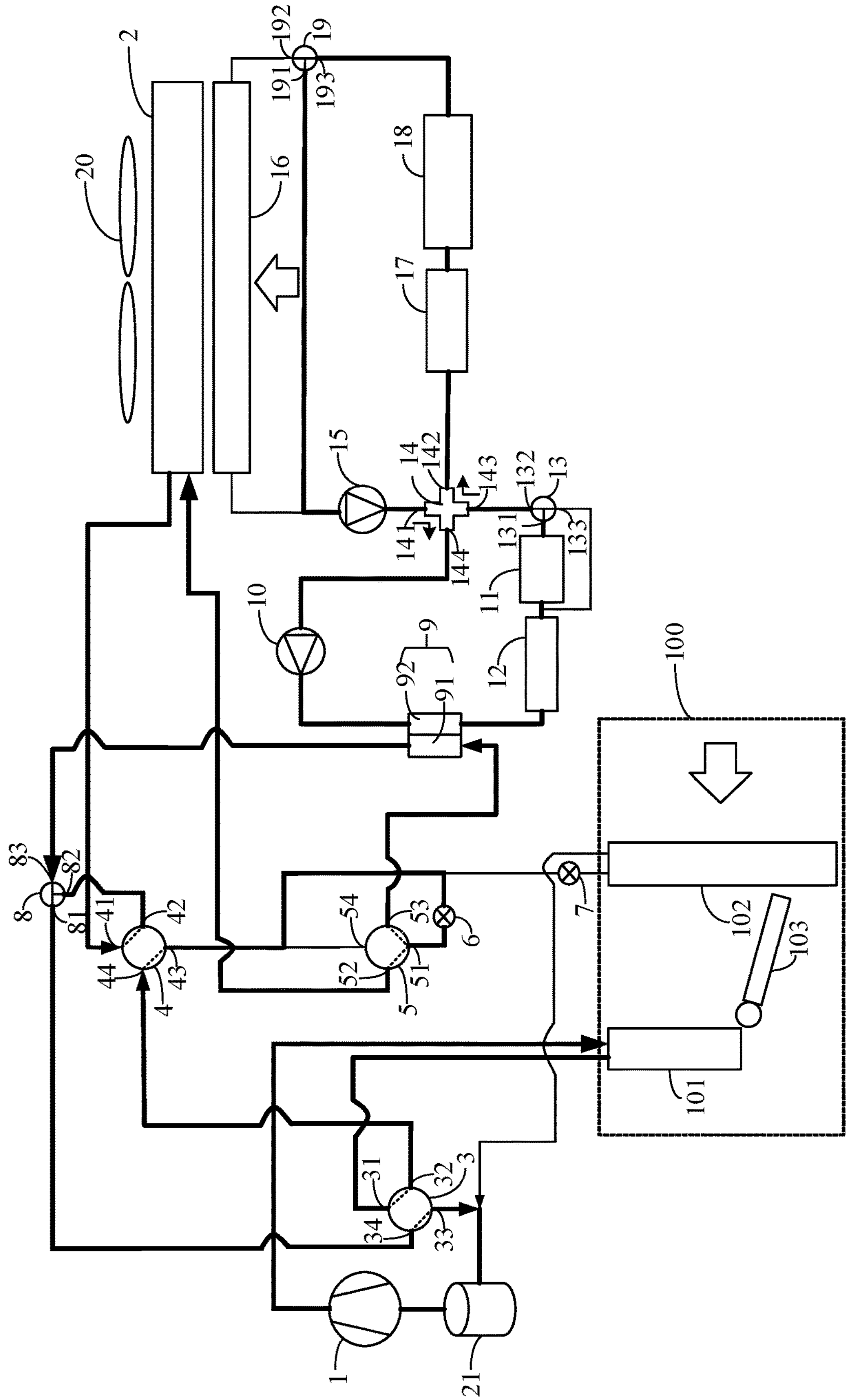
FIG. 7 is a schematic diagram of a mixed heating mode of a thermal management system in an embodiment of the present disclosure.

When the vehicle is in a low-temperature fast charging or overcharging state, the passenger compartment has a heating demand and the battery assembly has a cooling demand, the thermal management system is in the mixed heating mode. Referring to FIG. 7, in the mixed heating mode, the third flow direction switching device 3 is in the first working way; the second flow direction switching device 4 is in the first working mode; the first flow direction switching device 5 is in the first working state; the first port 51 communicates with both the second port 52 and the third port 53; the first throttling device 6 is in the throttling state; the second throttling device 7 is in the cut-off state; the first connection port 81 of the first multi-way device 8 communicates with both the second connection port 82 and the third connection port 83. In the mixed heating mode, the working principle of the coolant system is the same as that of the coolant system in the waste heat recovery mode, which can be referred to the relevant description of the coolant system in the waste heat recovery mode, and will not be repeated here.

In the refrigerant system, the compressor 1, the first heat exchanger 101, the third flow direction switching device 3, the second flow direction switching device 4, the first throttling device 6, the first flow direction switching device 5, the first heat exchange portion 91, the first multi-way device 8, the third flow direction switching device 3 and the compressor 1 are communicated in sequence to form a refrigerant loop. The compressor 1, the first heat exchanger 101, the third flow direction switching device 3, the second flow direction switching device 4, the first throttling device 6, the first flow direction switching device 5, the second heat exchanger 2, the second flow direction switching device 4, the first multi-way device 8, the third flow direction switching device 3 and the compressor 1 are communicated in sequence to form a refrigerant loop. The first heat exchanger 101 functions as a condenser. The second heat exchanger 2 and the third heat exchanger 9 function as evaporators.

Specifically, referring to FIG. 7, in the mixed heating mode, compared with the single heating mode, the refrigerant throttled by the first throttling device 6 is divided into two paths by the first flow direction switching device 5. One path enters the second heat exchanger 2, where it exchanges heat with the atmospheric environment. The other path enters the first heat exchange portion 91, and the refrigerant in the first heat exchange portion 91 of the third heat exchanger 9 exchanges heat with the coolant in the second heat exchange portion 92. The refrigerant flowing out of the second heat exchanger 2 flows through the second flow direction switching device 4, and then merges with the refrigerant flowing out of the first heat exchange portion 91 through the first multi-way device 8. The merged refrigerant flows through the third flow direction switching device 3 and then flows back into the compressor 1, and circulates in this way. In some other embodiments, according to different system designs, the refrigerant flowing out of the second heat exchanger 2 and the refrigerant flowing out of the first heat exchange portion 91 can be directly merged to the third flow direction switching device 3 or the compressor 1.

In the mixed heating mode, an opening ratio of the first multi-way device 8 can be adjusted according to the environmental temperature and humidity, and the thermal management requirements of the battery assembly, reasonably utilizing the environmental temperature of the atmospheric environment and the temperature of the coolant to realize the economical and efficient operation of the thermal management system.

Figure 8:
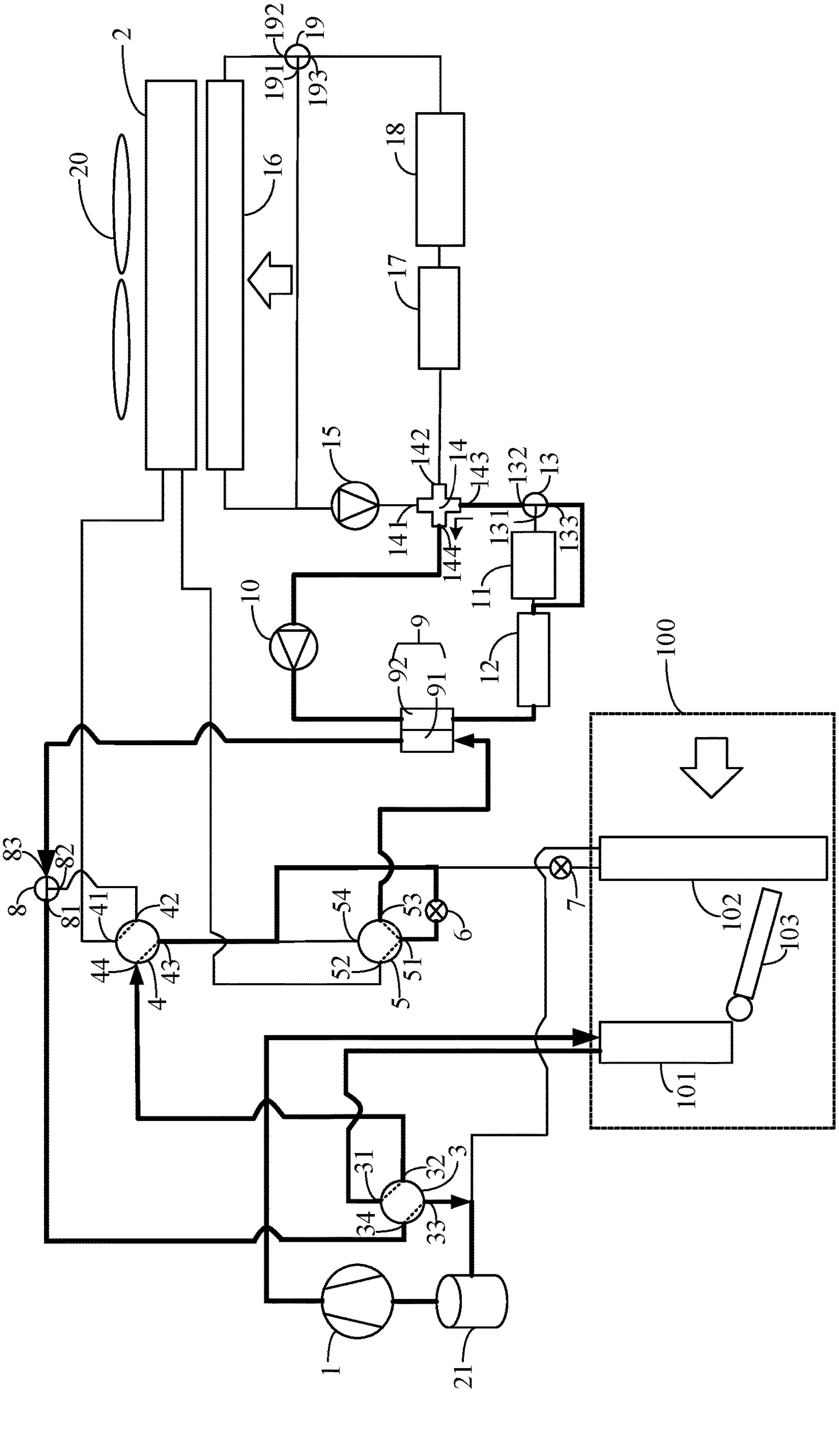
FIG. 8 is a schematic diagram of a rapid heating mode of a thermal management system in an embodiment of the present disclosure.

When the vehicle is in an extremely low temperature environment, the atmospheric environment, the motor assembly and the battery assembly have no available heat, but the passenger compartment has a heating demand, the thermal management system is in the rapid heating mode. Referring to FIG. 8, in the rapid heating mode, the third flow direction switching device 3 is in the first working way; the second flow direction switching device 4 is in the first working mode; the first flow direction switching device 5 is in the first working state; the first port 51 communicates with the third port 53; the first throttling device 6 is in the throttling state; the second throttling device 7 is in the cut-off state; the first connection port 81 of the first multi-way device 8 communicates with the third connection port 83; the fifth connection port 132 of the second multi-way device 13 communicates with the sixth connection port 133; the fourth multi-way device 14 is in the first connection state; the first pump 10 provides power to the coolant loop; and the second pump 15 is turned off.

In the coolant system, the first pump 10, the second heat exchange portion 92, the heating device 12, the first bypass branch, the second multi-way device 13 and the first pump 10 are communicated in sequence to form a coolant loop. The heating device 12 is turned on to heat the coolant. Through the circulating of the coolant, the second heat exchange portion 92 absorbs the heat provided by the heating device 12.

In the refrigerant system, the compressor 1, the first heat exchanger 101, the third flow direction switching device 3, the second flow direction switching device 4, the first throttling device 6, the first flow direction switching device 5, the first heat exchange portion 91, the first multi-way device 8, the third flow direction switching device 3 and the compressor 1 are communicated in sequence to form a refrigerant loop. The first heat exchanger 101 functions as a condenser, and the third heat exchanger 9 functions as an evaporator. In the rapid heating mode, the working principle of the refrigerant system is the same as that of the refrigerant system in the waste heat recovery mode, which can be referred to the relevant description of the refrigerant system in the waste heat recovery mode, and will not be repeated here.

At this time, according to whether the battery assembly needs to be heated, the opening ratio of the second multi-way device 13 can be adjusted. The coolant heated by the heating device 12 at least partly flows through the battery heat exchange device 11, so as to realize the heating of the battery assembly. According to whether the motor assembly needs to be heated, the state of the fourth multi-way device 14 can be adjusted. The coolant heated by the heating device 12 can flow through the motor heat exchange device 18, so as to realize the heating of the motor assembly.

In the single heating mode, the waste heat recovery mode, the mixed heating mode and the rapid heating mode, the first throttling device 6 is used as a throttling element. That is, in the heating modes, the second heat exchanger 2 and the third heat exchanger 9 share one throttling element, which can reduce the number of components of the thermal management system and simplify the structure of the thermal management system. Besides, in the heating mode, the second heat exchanger 2 and the third heat exchanger 9 are connected in parallel. The amount of refrigerant flowing through the second heat exchanger 2 and the third heat exchanger 9 can be adjusted according to the environmental temperature and humidity, the state of the battery assembly and the motor assembly, so as to balance the thermal management of the battery assembly, the thermal management of the motor assembly and the ability of the second heat exchanger 2 to prevent frosting. This can improve the frosting problem of the second heat exchanger 2 to a certain extent, and can also realize recovery and utilization of residual heat, which is beneficial for energy saving.

Figure 9:
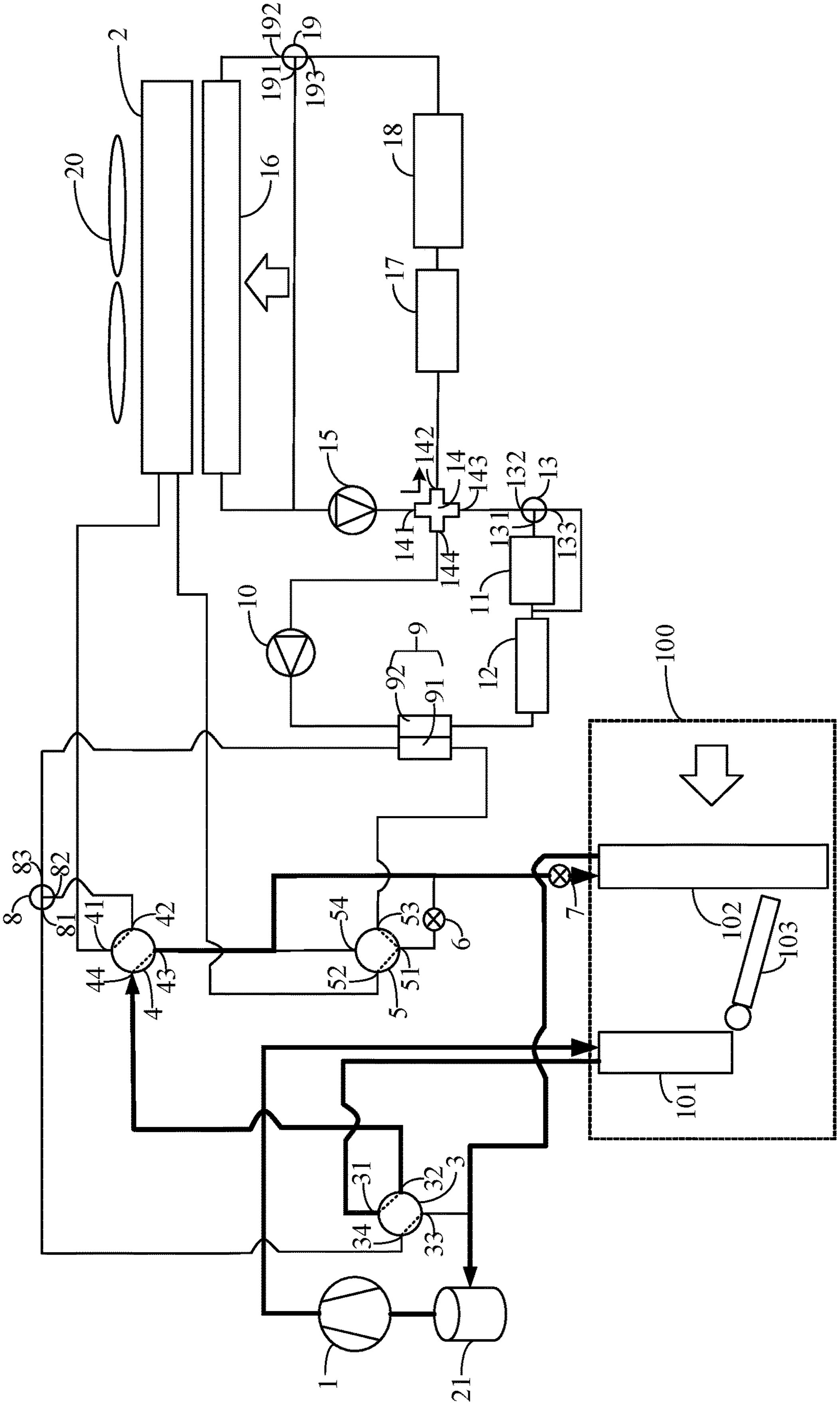
FIG. 9 is a schematic diagram of a first heating and dehumidification mode of a thermal management system in an embodiment of the present disclosure.
Figure 10:
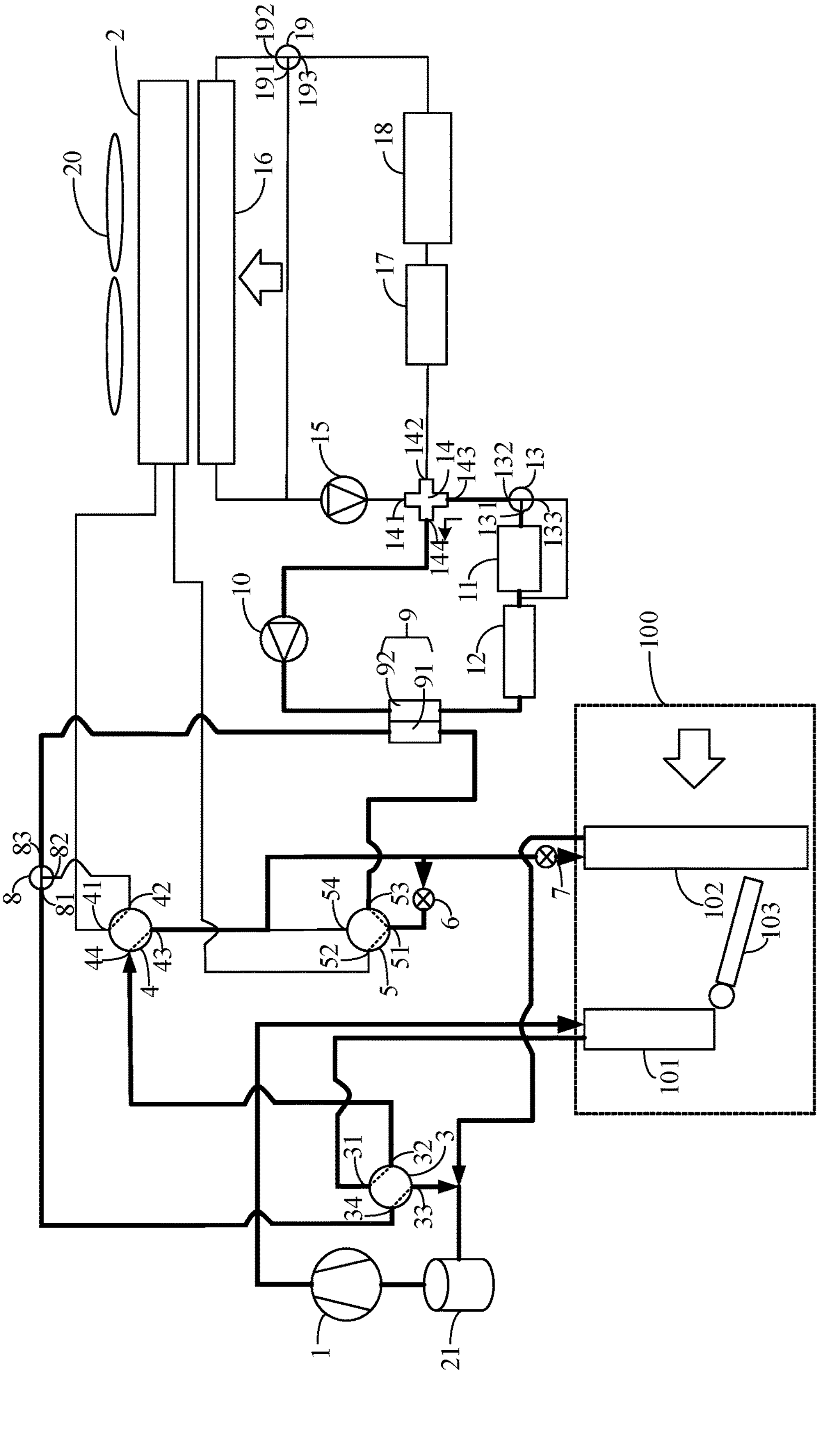
FIG. 10 is a schematic diagram of a second heating and dehumidification mode of a thermal management system in an embodiment of the present disclosure.
Figure 11:
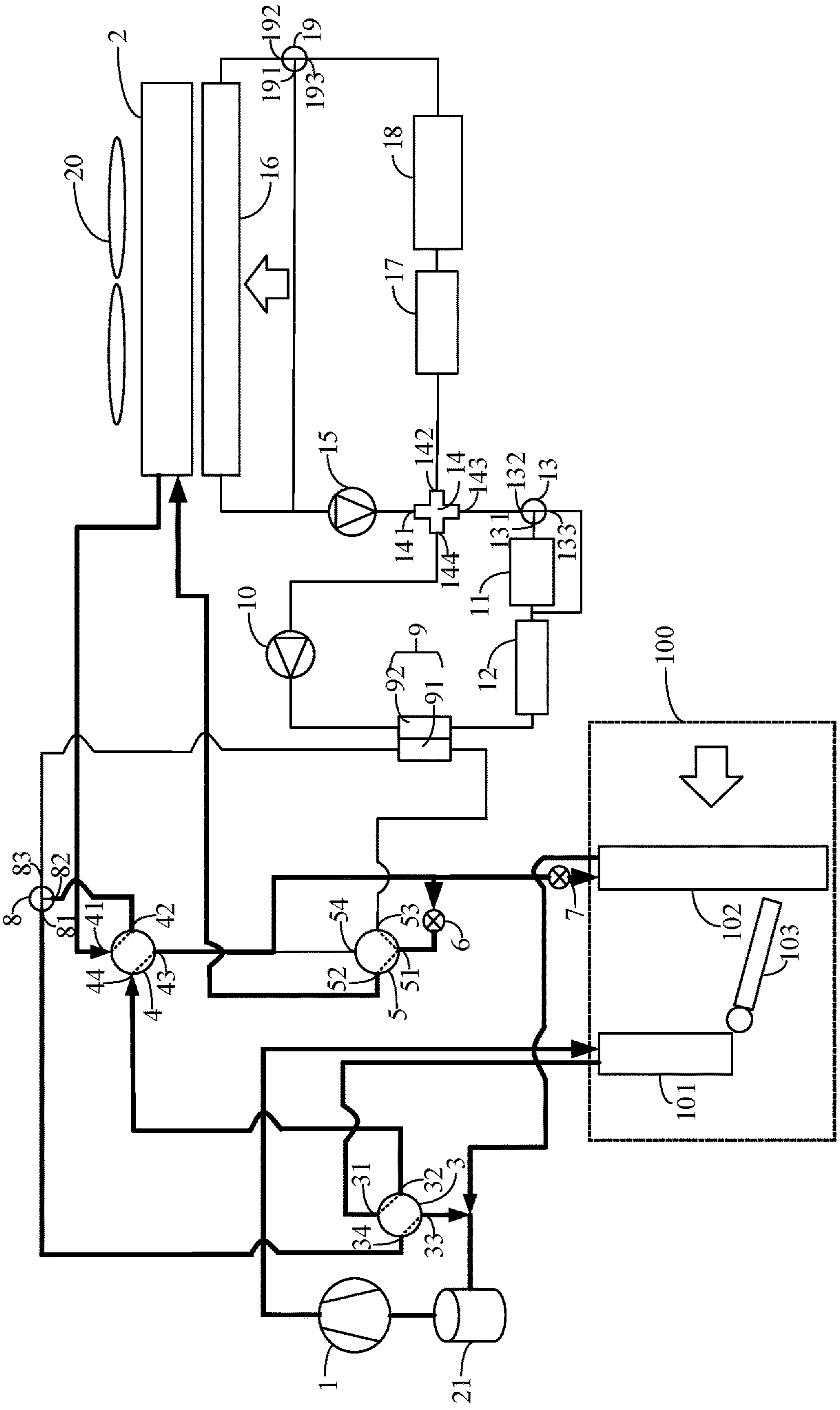
FIG. 11 is a schematic diagram of a third heating and dehumidification mode of a thermal management system in an embodiment of the present disclosure.

Referring to FIG. 9 to FIG. 11, the thermal management system includes a heating and dehumidification mode. When the environmental temperature is low and the humidity is high, the passenger compartment needs heating and dehumidification, and the heating and dehumidification mode is turned on. At this time, the damper 103 is opened; the first heat exchanger 101 functions as a condenser; and the air conditioning box 100 is in the internal circulation state. The heating and dehumidification mode includes a first heating and dehumidification mode, a second heating and dehumidification mode, and a third heating and dehumidification mode. The first heating and dehumidification mode, the second heating and dehumidification mode, and the third heating and dehumidification mode can all meet the heating and dehumidification requirements of the passenger compartment. Wherein, the first heating and dehumidification mode is a whole vehicle internal circulation mode, that is, the first heat exchanger 101 functions as a condenser, and the fourth heat exchanger 102 functions as an evaporator. The second heating and dehumidification mode uses the third heat exchanger 9 to cool the battery assembly on the basis of the whole vehicle internal circulation mode, which not only realizes the heating and dehumidification function, but also takes into account the thermal management of the battery, and can also improve the effect of heating and dehumidification. The third heating and dehumidification mode is based on the whole vehicle internal circulation mode, and uses the second heat exchanger 2 to utilize the temperature of the atmospheric environment so as to improve the effect of heating and dehumidification.

In an extremely low temperature environment, the passenger compartment needs heating and dehumidification, and when the atmospheric environment and the coolant loop have no heat available, the thermal management system is in the first heating and dehumidification mode. Referring to FIG. 9, in the first heating and dehumidification mode, the third flow direction switching device 3 is in the first working way; the second flow direction switching device 4 is in the first working mode; the first flow direction switching device 5 and the first multi-way device 8 are in the non-working state; the first throttling device 6 is in the cut-off state; and the second throttling device 7 is in the throttling state. In the first heating and dehumidification mode, the working principle of the coolant system is the same as that of the coolant system in the single heating mode. To adjust the state of the coolant system according to the thermal management requirements of the battery assembly and the motor assembly, reference can be made to the relevant description of the single heating mode, which will not be repeated here.

In the refrigerant system, the compressor 1, the first heat exchanger 101, the third flow direction switching device 3, the second flow direction switching device 4, the second throttling device 7, the fourth heat exchanger 102 and the compressor 1 are communicated in sequence to form a refrigerant loop. The first heat exchanger 101 functions as a condenser, and the fourth heat exchanger 102 functions as an evaporator.

Specifically, referring to FIG. 9, in the first heating and dehumidification mode, the compressor 1 compresses the low-temperature and low-pressure gaseous refrigerant into a high-temperature and high-pressure gaseous refrigerant. The high-temperature and high-pressure refrigerant flows into the first heat exchanger 101. The refrigerant in the first heat exchanger 101 heats the air around, so as to increase the temperature of the air around the first heat exchanger 101. The refrigerant flows out of the first heat exchanger 101, flows through the third flow direction switching device 3 and the second flow direction switching device 4 in sequence, and is throttled by the second throttling device 7 to reduce the temperature and pressure so as to become a low-temperature and low-pressure refrigerant. The low-temperature and low-pressure refrigerant enters the fourth heat exchanger 102 and absorbs the heat of the air around the fourth heat exchanger 102. The refrigerant undergoes a phase change and most of it evaporates into a low-temperature and low-pressure gaseous refrigerant. The refrigerant flowing out of the fourth heat exchanger 102 flows back into the compressor 1, and circulates in this way.

In the air conditioning box 100, since the fourth heat exchanger 102 is located on the windward side of the first heat exchanger 101. The air in the passenger compartment first flows through the fourth heat exchanger 102 and then flows through the first heat exchanger 101. When flowing through the fourth heat exchanger 102, the moisture in the air is condensed and precipitated when it is cooled, and the air is dried. The dried air flows through the first heat exchanger 101 to be heated, and the temperature of the air increases. Under the action of the air flow, the dried air with increased temperature enters the grille air ducts (not shown in the drawings) and is sent into the passenger compartment so as to realize the function of heating and dehumidifying the passenger compartment.

In the first heating and dehumidification mode, the vehicle is in the whole vehicle internal circulation mode, compared with the air-conditioning box in the external circulation state, it is more energy-saving, has better heating and dehumidification effects, and the energy efficiency ratio of the compressor 1 is also higher for energy saving.

In a medium-temperature environment, when the passenger compartment needs heating and dehumidification, and the battery assembly needs thermal management, the thermal management system is in the second heating and dehumidification mode. Referring to FIG. 10, in the second heating and dehumidification mode, the third flow direction switching device 3 is in the first working way; the second flow direction switching device 4 is in the first working mode; the first flow direction switching device 5 is in the first working state; the first port 51 communicates only with the third port 53; the first connection port 81 of the first multi-way device 8 communicates with the third connection port 83; the first throttling device 6 is in the throttling state; the second throttling device 7 is in the throttling state; the fourth connection port 131 of the second multi-way device 13 communicates with the fifth connection port 132; the fourth multi-way device 14 is in the first connection state; the first pump 10 provides power to the coolant loop; the second pump 15 is turned off; the heating device 12 is not turned on and is only used as a pipeline.

In the coolant system, the first pump 10, the second heat exchange portion 92, the heating device 12, the battery heat exchange device 11, the second multi-way device 13, the fourth multi-way device 14 and the first pump 10 are communicated in sequence to form a coolant loop, and the battery assembly is cooled by the second heat exchange portion 92. When the motor assembly needs to dissipate heat, the second pump 15 can be turned on. The second pump 15, the fourth multi-way device 14, the motor heat exchange device 18, the third multi-way device 19, the fifth heat exchanger 16 and the second pump 15 are communicated in sequence to form another coolant loop, and the motor assembly is cooled through the fifth heat exchanger 16. Optionally, when the motor assembly cannot be cooled by the fifth heat exchanger 16, the fourth multi-way device 14 can be set to be in the second connection state, utilizing the second bypass branch to bypass the fifth heat exchanger 16 so as to cool the motor assembly and the battery assembly through the second heat exchange portion 92.

In the refrigerant system, the compressor 1, the first heat exchanger 101, the third flow direction switching device 3, the second flow direction switching device 4, the second throttling device 7, the fourth heat exchanger 102 and the compressor 1 are communicated in sequence to form a refrigerant loop. The compressor 1, the first heat exchanger 101, the third flow switching device 3, the second flow switching device 4, the first throttling device 6, the first flow switching device 5, the first heat exchange portion 91, the first multi-way device 8, the third flow direction switching device 3 and the compressor 1 are communicated in sequence to form a refrigerant loop. The first heat exchanger 101 functions as a condenser. The third heat exchanger 9 and the fourth heat exchanger 102 function as evaporators.

Specifically, referring to FIG. 10, compared with the first heating and dehumidification mode, in the second heating and dehumidification mode, the refrigerant flowing out from the second flow direction switching device 4 is divided into two paths. One path enters the fourth heat exchanger 102 after being throttled by the second throttling device 7, where the fourth heat exchanger 102 absorbs the heat of the air around, and realizes the heating and dehumidification of the passenger compartment under the action of the air flow. The other path is throttled by the first throttling device 6. The throttled refrigerant flows through the first flow direction switching device 5 and then enters the first heat exchange portion 91. In the third heat exchanger 9, the refrigerant in the first heat exchange portion 91 exchanges heat with the coolant in the second heat exchange portion 92, and the temperature of the coolant decreases. The cooling of the battery assembly is realized through the circulating of the coolant. The refrigerant flowing out of the first heat exchange portion 91 flows through the first multi-way device 8 and the third flow direction switching device 3 in sequence, and then flows back into the compressor 1. The refrigerant flowing out of the fourth heat exchanger 102 flows back into the compressor 1, and circulates in this way. The working principle of realizing the heating and dehumidification of the passenger compartment in the second heating and dehumidification mode is the same as that of the first heating and dehumidification mode, which can be referred to the relevant description of the first heating and dehumidification mode, and will not be repeated here.

In the second heating and dehumidification mode, the fourth heat exchanger 102 is connected in parallel with the third heat exchanger 9 to realize the function of heating and dehumidification and the function of cooling the battery assembly at the same time, and the thermal management system has better heat management capability. Moreover, the residual heat in the coolant is recovered to the refrigerant through the third heat exchanger 9, thereby improving the effect of heating and dehumidification of the passenger compartment.

In a medium-temperature environment, when the passenger compartment needs heating and dehumidification, but the battery assembly has no heat management needs, the thermal management system can be in the third heating and dehumidification mode. Referring to FIG. 11, in the third heating and dehumidification mode, the third flow direction switching device 3 is in the first working way; the second flow direction switching device 4 is in the first working mode; the first flow direction switching device 5 is in the first working state; the first port 51 communicates only with the second port 52; the first connection port 81 of the first multi-way device 8 communicates with the second connection port 82; the first throttling device 6 is in the throttling state; and the second throttling device 7 is in the throttling state. In the third heating and dehumidification mode, the working principle of the coolant system is the same as that of the coolant system in the single heating mode. To adjust the state of the coolant system according to the thermal management requirements of the battery assembly and the motor assembly, reference can be made to the relevant description of the single heating mode, which will not be repeated here.

In the refrigerant system, the compressor 1, the first heat exchanger 101, the third flow direction switching device 3, the second flow direction switching device 4, the second throttling device 7, the fourth heat exchanger 102, and the compressor 1 are communicated in sequence to form a refrigerant loop. The compressor 1, the first heat exchanger 101, the third flow direction switching device 3, the second flow direction switching device 4, the first throttling device 6, the first flow direction switching device 5, the second heat exchanger 2, the second flow direction switching device 4, the first multi-way device 8, the third flow direction switching device 3 and the compressor 1 are communicated in sequence to form a refrigerant loop. The first heat exchanger 101 functions as a condenser. The second heat exchanger 2 and the fourth heat exchanger 102 function as evaporators.

Specifically, referring to FIG. 11, compared with the first heating and dehumidification mode, in the third heating and dehumidification mode, the refrigerant flowing out from the second flow direction switching device 4 is divided into two paths. One path enters the fourth heat exchanger 102 after being throttled by the second throttling device 7, absorbs the heat of the air around the fourth heat exchanger 102, and realizes the heating and dehumidification of the passenger compartment under the action of the air flow. The other path is throttled through the first throttling device 6. The throttled refrigerant flows through the first flow direction switching device 5 and then enters the second heat exchanger 2, where it exchanges heat with the atmospheric environment. The refrigerant flowing out of the second heat exchanger 2 flows through the second flow direction switching device 4, the first multi-way device 8 and the third flow direction switching device 3 in sequence, and then flows back into the compressor 1. The refrigerant flowing out of the fourth heat exchanger 102 flows back into the compressor 1, and circulates in this way. The working principle of realizing the heating and dehumidification of the passenger compartment in the third heating and dehumidification mode is the same as that in the first heating and dehumidification mode, and reference can be made to the relevant description of the first heating and dehumidification mode, and will not be repeated here.

In the third heating and dehumidification mode, the fourth heat exchanger 102 is connected in parallel with the second heat exchanger 2. The heat of the atmospheric environment can be utilized through the second heat exchanger 2, thereby ensuring the effect of heating and dehumidification in the passenger compartment.

The present disclosure provides the thermal management system with a simple structure. For example, referring to FIG. 5 and FIG. 11, switching between the single heating mode and the third heating and dehumidification mode can be realized just by controlling the state of the second throttling device 7. Referring to FIG. 5 and FIG. 9, switching between the single heating mode and the first heating and dehumidification mode can be realized by controlling the states of the first throttling device 6, the second throttling device 7 and the first multi-way device 8. Referring to FIG. 10 and FIG. 11, switching between the second heating and dehumidification mode and the third heating and dehumidification mode can be realized just by controlling the state of the first flow direction switching device 5. The thermal management system of the present disclosure realizes switching between various modes through the control of relatively few components, thereby reducing the difficulty of controlling the thermal management system.

Figure 12:
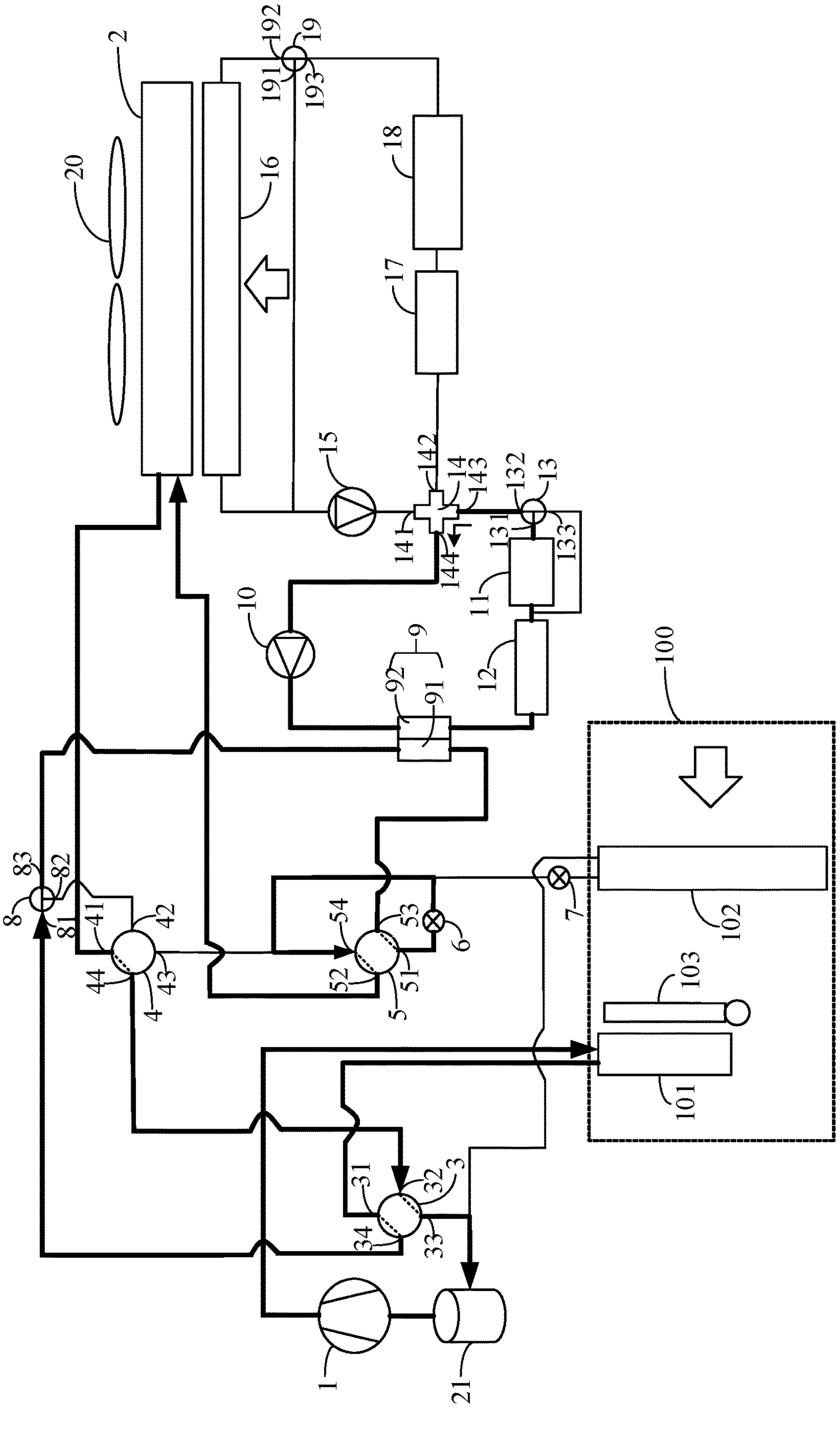
FIG. 12 is a schematic diagram of a battery single heating mode of a thermal management system in an embodiment of the present disclosure.

Referring to FIG. 12, the thermal management system includes the battery single heating mode, which can use the refrigerant system to heat the coolant, thereby heating the battery assembly, which is more energy-efficient than using the heating device 12 to heat the battery assembly. At this time, the damper 103 is closed, and the first heat exchanger 101 does not participate in heat exchange. In the battery single heating mode, the third flow direction switching device 3 is in the second working way; the second flow direction switching device 4 is in the second working mode; the first flow direction switching device 5 is in the second working state; the first connection port 81 of the first multi-way device 8 communicates with the third connection port 83; the first throttling device 6 is in the throttling state; the second throttling device 7 is in the cut-off state; the fourth connection port 131 of the second multi-way device 13 communicates with the fifth connection port 132; the fourth multi-way device 14 is in the first connection state; the first pump 10 provides power to the coolant loop; the second pump 15 is turned off; and the heating device 12 is not turned on and is only used as a pipeline.

In the coolant system, the first pump 10, the second heat exchange portion 92, the heating device 12, the battery heat exchange device 11, the second multi-way device 13, the fourth multi-way device 14 and the first pump 10 are communicated in sequence to form a coolant loop, and the battery assembly is heated through the second heat exchange portion 92. When the motor assembly needs to dissipate heat, the second pump 15 can be turned on. The second pump 15, the fourth multi-way device 14, the motor heat exchange device 18, the third multi-way device 19, the fifth heat exchanger 16 and the second pump 15 are communicated in sequence to form another coolant loop, and the motor assembly is cooled by the fifth heat exchanger 16.

In the refrigerant system, the compressor 1, the first heat exchanger 101, the third flow direction switching device 3, the first multi-way device 8, the first heat exchange portion 91, the first flow direction switching device 5, the first throttling device 6, the first flow switching device the second heat exchanger 2, the second flow switching device 4, the third flow switching device 3 and the compressor 1 are communicated in sequence to form a refrigerant loop. The third heat exchanger 9 functions as a condenser. The second heat exchanger 2 functions as an evaporator.

Specifically, referring to FIG. 12, in the battery single heating mode, the compressor 1 compresses the low-temperature and low-pressure gaseous refrigerant into a high-temperature and high-pressure gaseous refrigerant. The high-temperature and high-pressure refrigerant flows through the first heat exchanger 101, the third flow direction switching device 3 and the first multi-way device 8 in sequence, and then flows into the first heat exchange portion 91. In the third heat exchanger 9, the coolant in the second heat exchange portion 92 exchanges heat with the refrigerant in the first heat exchange portion 91. The temperature of the coolant rises, and the heating of the battery is realized through the circulating of the coolant. The refrigerant flowing into the first heat exchange portion 91 flows through the first flow direction switching device 5 and then throttled by the first throttling device 6, so that the temperature and the pressure are lowered to become a low-temperature and low-pressure refrigerant. The low-temperature and low-pressure refrigerant flows through the first flow direction switching device 5 again and then enters the second heat exchanger 2, where it exchanges heat with the atmospheric environment. The refrigerant undergoes a phase change and most of it evaporates into a low-temperature and low-pressure gaseous refrigerant. The refrigerant flowing out of the second heat exchanger 2 flows through the second flow direction switching device 4 and the third flow direction switching device 3 in sequence, and then flows back into the compressor 1, and circulates in this way.

In the single heating mode of the battery, the heat of the atmospheric environment is absorbed through the second heat exchanger 2, then the heat is released into the coolant through the third heat exchanger 9, and then the battery assembly is heated through the circulating of the coolant. That is, the heat of the atmospheric environment is utilized to heat the battery assembly, which has relatively high energy efficiency and is beneficial for energy saving.

Figure 13:
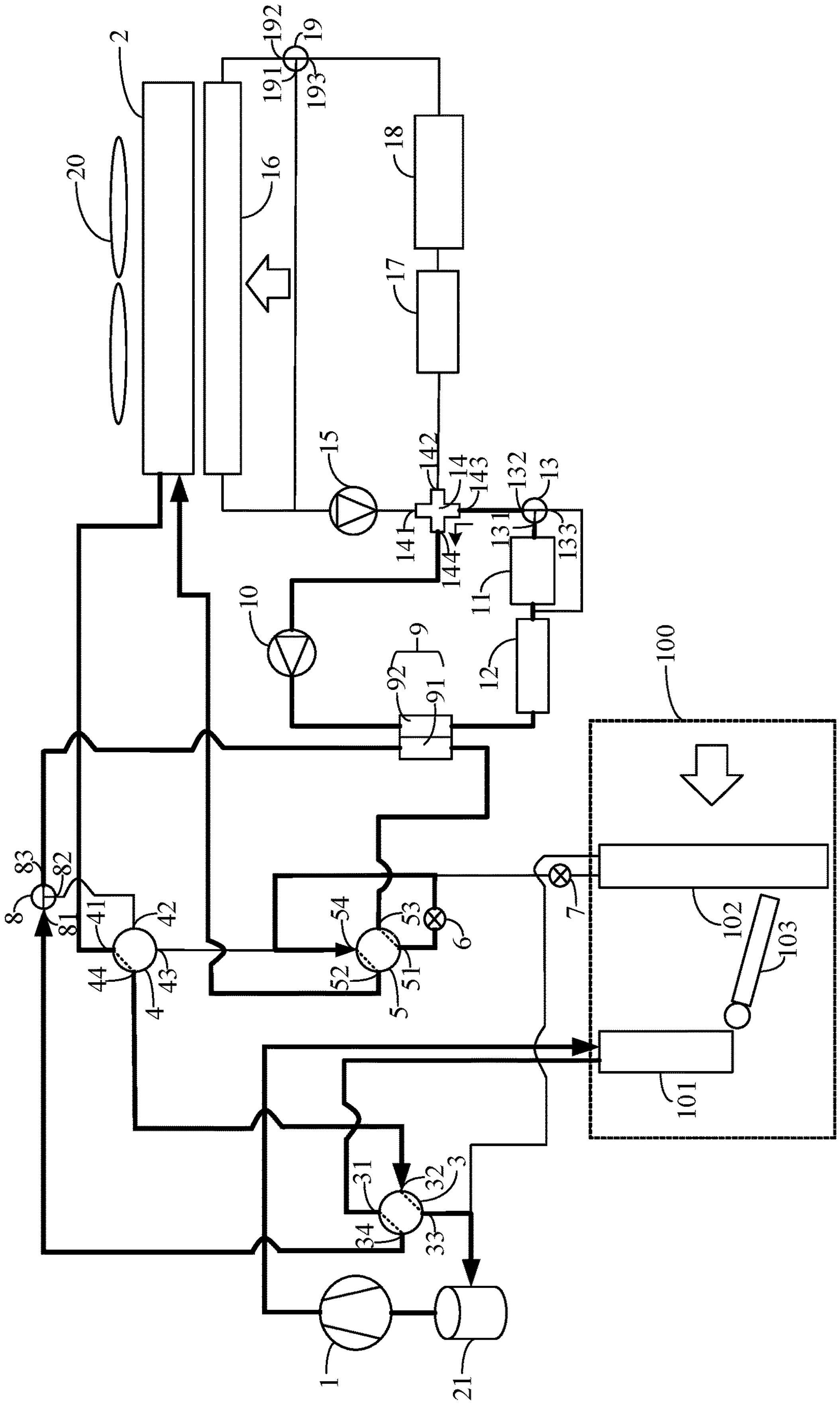
FIG. 13 is a schematic diagram of a hybrid heating mode of a thermal management system in an embodiment of the present disclosure.

Referring to FIG. 13, the thermal management system includes the hybrid heating mode. Compared with the battery single heating mode, the refrigerant system can be used to heat the battery assembly and the passenger compartment at the same time. The working principle of the refrigerant system in the hybrid heating mode is basically the same as that of the refrigerant system in the battery single heating mode. The working principle of the coolant system in the hybrid heating mode is different from the working principle of the coolant system in the battery single heating mode in that: in the hybrid heating mode, the damper 103 is opened; the first heat exchanger 101 functions as a condenser; the refrigerant in the first heat exchanger 101 heats the air around, so as to increase the temperature of the air around the first heat exchanger 101. Under the action of the air flow, the hot air enters the grille air ducts (not shown in the drawings) and is sent into the passenger compartment to increase the temperature of the passenger compartment, thereby realizing the heating function of the passenger compartment.

In the battery single heating mode and the hybrid heating mode, the first heat exchanger 101 is connected in series with the first heat exchange portion 91. Switching between the battery single heating mode and the hybrid heating mode is realized just by controlling the state of the damper 103. When the damper 103 is closed, it is the battery single heating mode. When the damper 103 is opened, it is the hybrid heating mode. Just through the control of a simple mechanical structure, the switching between modes can be realized, and the switching method is relatively simple.

Figure 14:
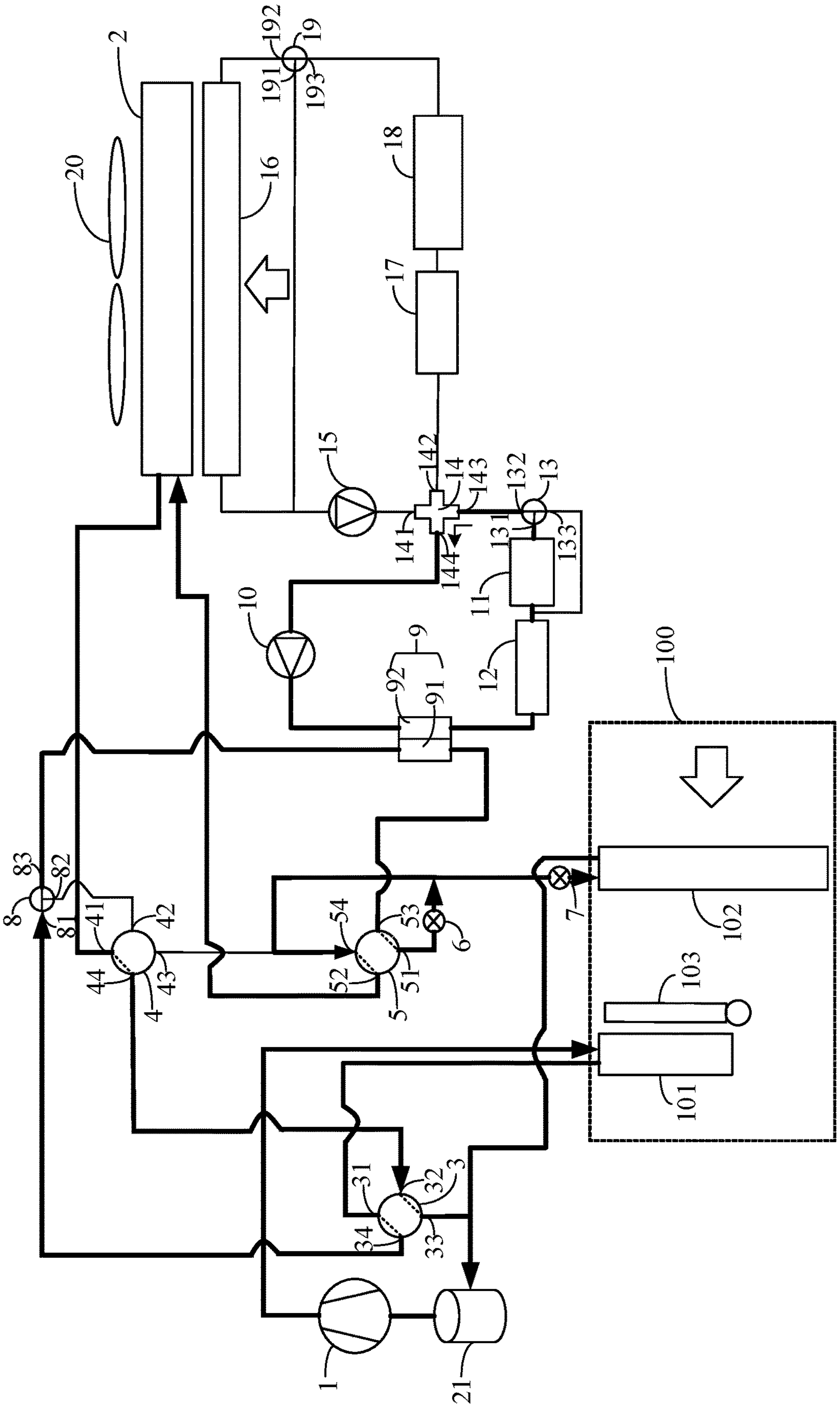
FIG. 14 is a schematic diagram of a hybrid heat exchange mode of a thermal management system in an embodiment of the present disclosure.

Referring to FIG. 14, the thermal management system includes the hybrid heat exchange mode, compared with the battery single heating mode, the refrigerant system can be used to heat the battery assembly and cool the passenger compartment at the same time. At this time, the damper 103 is closed, and the first heat exchanger 101 does not participate in heat exchange. In the hybrid heat exchange mode, the third flow direction switching device 3 is in the second working way; the second flow direction switching device 4 is in the second working mode; the first flow direction switching device 5 is in the second working state; the first connection port 81 of the first multi-way device 8 communicates with the third connection port 83; the first throttling device 6 is in the throttling state; and the second throttling device 7 is in the throttling state or the conducting state. In the hybrid heat exchange mode, the working principle of the coolant system is the same as that in the battery single heating mode. To adjust the state of the coolant system according to the thermal management requirements of the battery assembly and the motor assembly, reference can be made to the relevant description of the battery single heating mode, which will not be repeated here.

In the refrigerant system, the compressor 1, the first heat exchanger 101, the third flow direction switching device 3, the first multi-way device 8, the first heat exchange portion 91, the first flow direction switching device 5, the first throttling device 6, the first flow switching device the second heat exchanger 2, the second flow switching device 4, the third flow switching device 3 and the compressor 1 are communicated in sequence to form a refrigerant loop. The compressor 1, the first heat exchanger 101, the third flow direction switching device 3, the first multi-way device 8, the first heat exchange portion 91, the first flow direction switching device the first throttling device 6, the second throttling device 7, the fourth heat exchanger 102 and the compressor 1 are communicated in sequence to form a refrigerant loop. The third heat exchanger 9 functions as a condenser. The second heat exchanger 2 and the fourth heat exchanger 102 function as evaporators.

Specifically, referring to FIG. 14, compared with the battery single heating mode, in the hybrid heat exchange mode, the refrigerant throttled by the first throttling device 6 is divided into two paths. One path of refrigerant flows through the first flow direction switching device 5 again and then enters the second heat exchanger 2, where it exchanges heat with the atmospheric environment. The other refrigerant can flow into the fourth heat exchanger 102 through the second throttling device 7 or flow into the fourth heat exchanger 102 after being throttled by the second throttling device 7. The fourth heat exchanger 102 absorbs the heat of the air around to reduce the temperature of the air around the fourth heat exchanger 102. Under the action of air flow, cold air flows into the passenger compartment, which can realize the cooling of the passenger compartment. The refrigerant flowing out of the fourth heat exchanger 102 flows back into the compressor 1. The refrigerant flowing out of the second heat exchanger 2 flows through the second flow direction switching device 4 and the third flow direction switching device 3 in sequence, and then flows back into the compressor 1, and circulates in this way.

In the hybrid heat exchange mode, the air conditioning box 100 may be in the internal circulation state. The fourth heat exchanger 102 absorbs the waste heat in the passenger compartment and solar radiation heat in the vehicle, and adjusts the temperature in the passenger compartment, so as to realize recovery and utilization of waste heat in the vehicle, which is beneficial for energy saving. The air conditioning box 100 can also be in the external circulation state. The fourth heat exchanger 102 absorbs the heat of the environment outside the vehicle again, and fully utilizes the heat of the atmospheric environment, which is beneficial for energy saving.

In some embodiments, in the hybrid heat exchange mode, the damper 103 can be opened to realize the function of heating and dehumidification of the passenger compartment, and the function of battery heating. Switching among the battery single heating mode, the hybrid heating mode and the hybrid heat exchange mode is relatively simple, which can be realized by controlling the mechanical structure or controlling the opening and closing of a valve, thereby making the structure of the thermal management system relatively simple.

Figure 15:
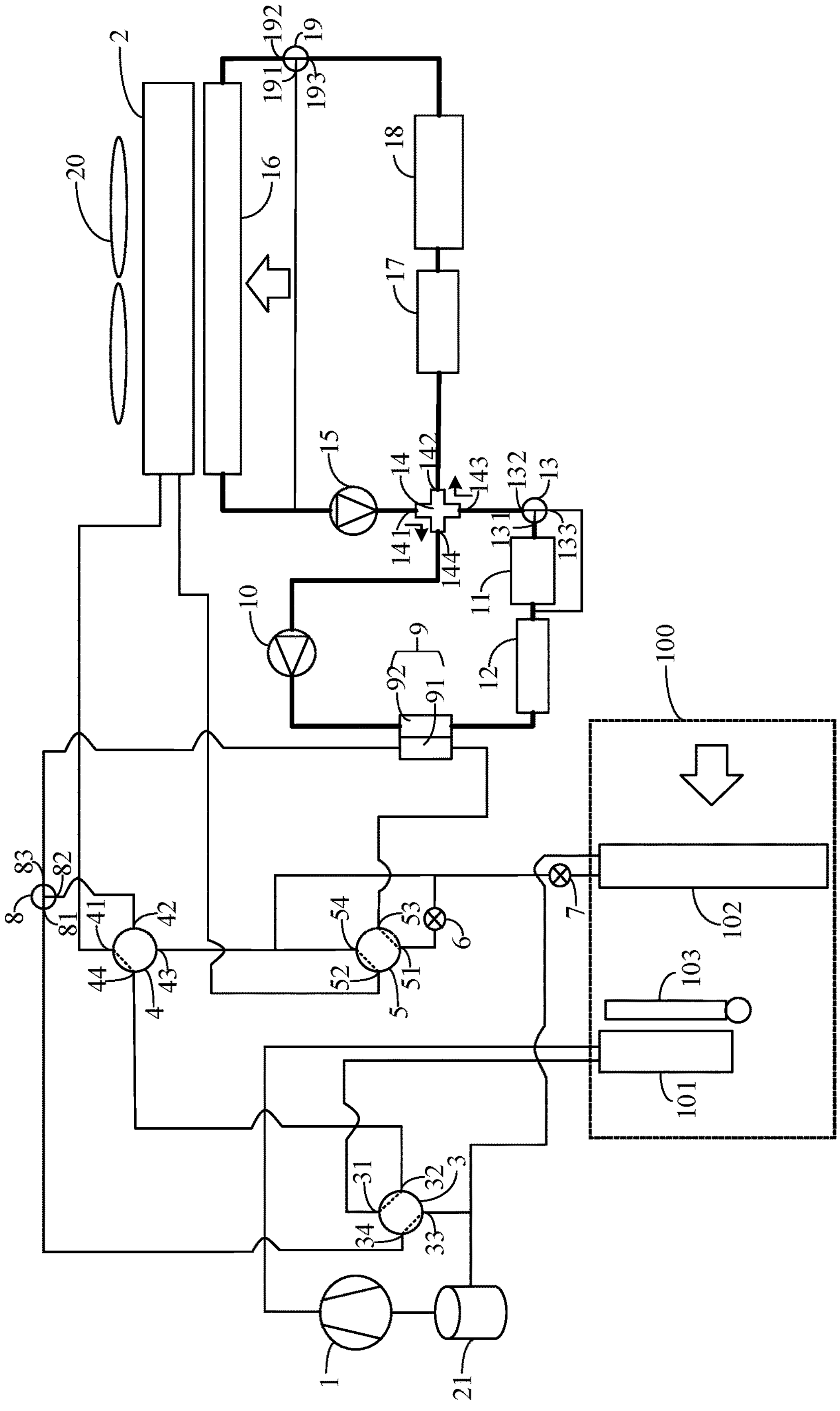
FIG. 15 is a schematic diagram of a heat dissipation mode of a thermal management system in an embodiment of the present disclosure.

Referring to FIG. 15, the thermal management system includes a heat dissipation mode, which is suitable for an initial stage of fast charging of the battery assembly, and cools the battery assembly through the fifth heat exchanger 16. Specifically, the refrigerant system is turned off; the fourth connection port 131 of the second multi-way device 13 communicates with the fifth connection port 132; the eighth connection port 192 of the third multi-way device 19 communicates with the ninth connection port 193; the fourth multi-way device 14 is in the second connection state; at least one of the first pump 10 and the second pump 15 provides power to the coolant loop; and the heating device 12 is turned off.

In the coolant system, the first pump 10, the second heat exchange portion 92, the heating device 12, the battery heat exchange device 11, the second multi-way device 13, the fourth multi-way device 14, the motor heat exchange device 18, the third multi-way device 19, the fifth heat exchanger 16, the second pump 15, the fourth multi-way device 14 and the first pump 10 are communicated in sequence to form a coolant loop. Through the circulating of the coolant, the heat of the battery assembly is taken to the fifth heat exchanger 16 and released to the atmospheric environment, which reduces the use of the compressor 1 and can achieve the purpose of energy saving.

Figure 16:
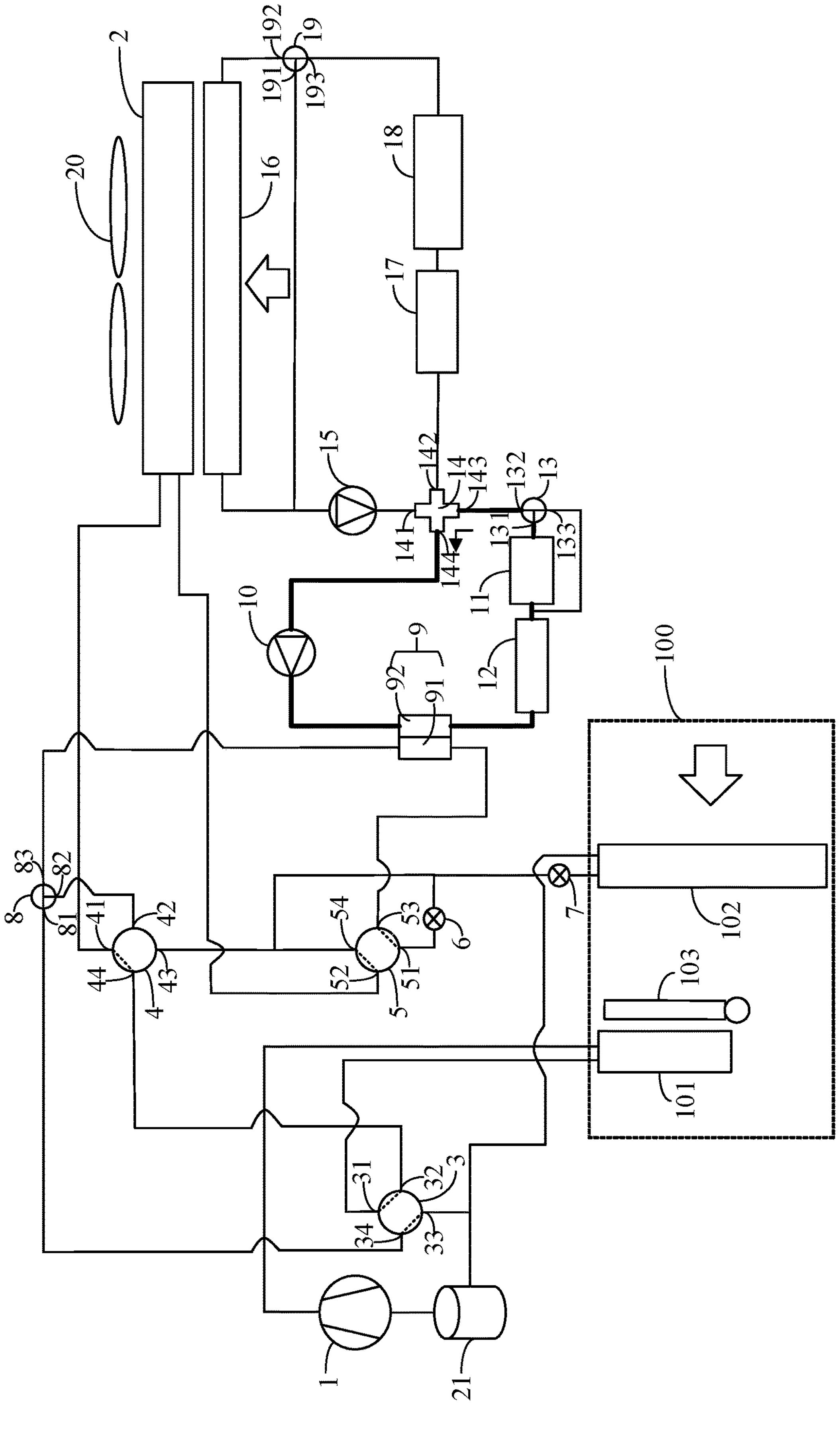
FIG. 16 is a schematic diagram of a battery heating mode of a thermal management system in an embodiment of the present disclosure.

Referring to FIG. 16, the thermal management system includes the battery heating mode, which is suitable for an extremely low temperature environment and the compressor 1 is not suitable to be turned on, and the battery assembly is heated by the heating device 12. Specifically, the refrigerant system is turned off; the fourth connection port 131 of the second multi-way device 13 communicates with the fifth connection port 132; the fourth multi-way device 14 is in the first connection state; the first pump 10 provides power to the coolant loop; the second pump 15 is turned off; and the heating device 12 is turned on to heat the coolant.

In the coolant system, the first pump 10, the second heat exchange portion 92, the heating device 12, the battery heat exchange device 11, the second multi-way device 13, the fourth multi-way device 14 and the first pump 10 are communicated in sequence to form a coolant loop. Through the circulating of the coolant, the heating device 12 is used to heat the battery assembly, so as to ensure that the battery can work in a proper temperature range.

It should be noted that, in the embodiments of the present disclosure, sequential communication only illustrates the sequence relationship of communications between various components, and other components, such as a shut-off valve, may also be included between various components.

The present disclosure further provides a control method of the thermal management system, and the control method in the present disclosure is applied to the thermal management system of the above-mentioned embodiments. The thermal management system further includes a control system, which can be used to control the working state of the refrigerant system and the working state of the coolant system.

Referring to FIG. 1, the control system includes a controller 200 and a plurality of sensors. The plurality of sensors are used to obtain the operating information of the various heat exchangers, motors, and batteries. Optionally, the operating information includes temperature. The controller 200 is electrically connected to components such as the compressor 1, a plurality of throttling devices, a plurality of flow direction switching devices, a plurality of pumps, a plurality of multi-way devices, and the plurality of sensors. The controller 200 can be used to acquire the operating information obtained by the sensors. The controller 200 can be used to adjust the working states of the above-mentioned electrically connected components. The adjustment of the working states includes at least one of opening the component, closing the component, adjusting the rotation speed, adjusting the opening and adjusting the power. The controller 200 can be used to implement the control method of the thermal management system.

The control method of thermal management systems includes:

obtaining passenger's requirements and the operating information obtained by the sensors; and according to the passenger's requirements and the operating information obtained from the sensors, adjusting the working status of each component in the thermal management system by the controller 200, so that the thermal management system executes an appropriate air-conditioning operation mode, thereby realizing the thermal management of the passenger compartment, the motor and the battery.

The thermal management system further includes an interaction device. The controller 200 is electrically connected with the interaction device. The controller 200 can obtain the passenger's requirements through the interaction device, such as a target temperature or an operation mode required by the passenger. Optionally, the interactive device may be a control panel of the electric vehicle. The operation mode of the air conditioner includes all the operation modes of the above-mentioned thermal management systems and the like. For the connection status of the thermal management systems in all the operation modes of the above thermal management systems, reference can be made to the previous description about the thermal management systems, which will not be repeated here.

The above descriptions are only preferred embodiments of the present disclosure, and are not intended to limit the present disclosure in any form. Although the disclosure has been disclosed above with preferred embodiments, it is not intended to limit the present disclosure. Any skilled in the art may use the technical contents disclosed above to make some changes or modify them into equivalent embodiments without departing from the scope of the technical solutions disclosed in the present disclosure. However, any simple modifications, equivalent changes and modifications made to the above embodiments based on the technical essence of the present disclosure are still within the scope of the technical solution of the present disclosure.

What is claimed is:

1. A thermal management system, comprising: a compressor, a first heat exchanger, a second heat exchanger, a third heat exchanger, a first throttler and a first flow direction switcher;

the first flow direction switcher comprising a first port, a second port and a third port; the first flow direction switcher having a first working state; in the first working state, the first port communicating with at least one of the second port and the third port;

the thermal management system comprising a controller; the thermal management system having a heating mode; the controller being capable of executing the heating mode; in the heating mode, the first throttler being in a throttling state; the first flow direction switcher being in a first working state; an outlet of the compressor communicating with an inlet of the first heat exchanger; an outlet of the first heat exchanger communicating with a second end port of the first throttler; a first end port of the first throttler communicating with the first port; the first port communicating with the second port; the second port communicating with a first end port of the second heat exchanger; a second end port of the second heat exchanger communicating with an inlet of the compressor; or, the first port communicating with the third port; the third port communicating with a first end port of the third heat exchanger; a second end port of the third heat exchanger communicating with the inlet of the compressor;

wherein the third heat exchanger comprises a first heat exchange portion and a second heat exchange portion; the first heat exchange portion is capable of being not in fluid communication with the second heat exchange portion; the first heat exchange portion and the second heat exchange portion are configured to perform heat exchange; the first heat exchange portion is communicated between the third port and the inlet of the compressor; or, the first heat exchange portion is communicated between the third port and the outlet of the compressor;

the thermal management system further comprises a first pump, a battery heat exchanger, a motor heat exchanger and a heater;

the heating mode comprises a rapid heating mode and a waste heat recovery mode; in the rapid heating mode and the waste heat recovery mode, the first throttler is in the throttling state; the first port communicates with the third port; the third port communicates with a port of the first heat exchange portion; another port of the first heat exchange portion communicates with the inlet of the compressor; the compressor, the first heat exchanger, the first throttler and the first heat exchange portion are capable of being in fluid communication; the first throttler is disposed between the outlet of the first heat exchanger and an inlet of the first heat exchange portion;

in the rapid heating mode, the heater, the first pump and the second heat exchange portion are capable of being in fluid communication; the first heat exchange portion exchanges heat with the second heat exchange portion; in the waste heat recovery mode, the battery heat exchanger, the first pump and the second heat exchange portion are capable of being in fluid communication; or, the battery heat exchanger, the motor heat exchanger, the first pump and the second heat exchange portion are capable of being in fluid communication; the first heat exchange portion exchanges heat with the second heat exchange portion.

2. The thermal management system according to claim 1, wherein the thermal management system further comprises a second throttler, a fourth heat exchanger and an air conditioning box; both the first heat exchanger and the fourth heat exchanger are located in the air conditioning box; the fourth heat exchanger is located on a windward side of the first heat exchanger; the second throttler is disposed on an inlet side of the fourth heat exchanger;

the thermal management system has a heating and dehumidification mode; the controller is capable of executing the heating and dehumidification mode; in the heating and dehumidification mode, the second throttler is in a throttling state; the compressor, the first heat exchanger, the second throttler and the fourth heat exchanger are capable of being in fluid communication; the second throttler is disposed between the outlet of the first heat exchanger and an inlet of the fourth heat exchanger; the first throttler is in the throttling state or a cut-off state; the first flow direction switcher is in the first working state.

3. The thermal management system according to claim 2, wherein the first flow direction switcher further comprises a fourth port; the first flow direction switcher further has a second working state; in the second working state, the first port communicates with the third port; the second port communicates with the fourth port;

the thermal management system comprises a second flow direction switcher; the second flow direction switcher comprises a fifth port, a sixth port, a seventh port and an eighth port; the second flow direction switcher has a first working mode and a second working mode; in the first working mode, the fifth port communicates with the sixth port; the seventh port communicates with the eighth port; in the second working mode, the fifth port communicates with the eighth port; the sixth port is capable of being in fluid communication or capable of being not in fluid communication with the seventh port;

in the heating mode and the heating and dehumidification mode, the second flow direction switcher is in the first working mode; the outlet of the first heat exchanger communicates with the eighth port; the seventh port communicates with the second end port of the first throttler and an inlet of the second throttler; the first end port of the first throttler communicates with the first port; the second port communicates with the first end port of the second heat exchanger; the third port communicates with the first end port of the third heat exchanger.

4. The thermal management system according to claim 3, wherein the thermal management system has a single cooling mode, a battery single cooling mode, and a hybrid cooling mode; the single cooling mode, the controller is capable of executing the battery single cooling mode and the hybrid cooling mode; in the single cooling mode, the battery single cooling mode and the hybrid cooling mode, the first flow direction switcher is in the second working state; the second port communicates with the first end port of the second heat exchanger; the second flow direction switcher is in the second working mode; the fifth port communicates with the second end port of the second heat exchanger; the eighth port communicates with the outlet of the first heat exchanger;

in the single cooling mode, the fourth port communicates with the inlet of the second throttler; the first throttler is in the cut-off state; the second throttler is in the throttling state; the compressor, the second heat exchanger, the second throttler and the fourth heat exchanger are capable of being in fluid communication; the second throttler is disposed between the outlet of the second heat exchanger and the inlet of the fourth heat exchanger;

in the battery single cooling mode, the fourth port communicates with the second end port of the first throttler; the first port communicates with the first end port of the first throttler; the third port communicates with the first end port of the third heat exchanger; the first throttler is in the throttling state; the second throttler is in a cut-off state; the compressor, the second heat exchanger, the first throttler and the first heat exchange portion are capable of being in fluid communication; the first throttler is disposed between the outlet of the second heat exchanger and the inlet of the first heat exchange portion; the first pump, the battery heat exchanger and the second heat exchange portion are capable of being in fluid communication; the first heat exchange portion exchanges heat with the second heat exchange portion;

in the hybrid cooling mode, the fourth port communicates with the second end port of the first throttler and the inlet of the second throttler; the first port communicates with the first end port of the first throttler; the third port communicates with the first end port of the third heat exchanger; the first throttler is in the throttling state; the second throttler is in the throttling state; the compressor, the second heat exchanger, the second throttler and the fourth heat exchanger are capable of being in fluid communication; the second throttler is disposed between the outlet of the second heat exchanger and the inlet of the fourth heat exchanger; the compressor, the second heat exchanger, the first throttler and the first heat exchange portion are capable of being in fluid communication; the first throttler is disposed between the outlet of the second heat exchanger and the inlet of the first heat exchange portion; the first pump, the battery heat exchanger and the second heat exchange portion are capable of being in fluid communication; the first heat exchange portion exchanges heat with the second heat exchange portion.

5. The thermal management system according to claim 3, wherein the thermal management system comprises a third flow direction switcher; the third flow direction switcher comprises a ninth port, a tenth port, an eleventh port and a twelfth port; the third flow direction switcher comprises a first working way and a second working way; in the first working way, the ninth port communicates with the tenth port; the eleventh port communicates with the twelfth port; in the second working way, the ninth port communicates with the twelfth port; the tenth port communicates with the eleventh port;

the outlet of the compressor communicates with the inlet of the first heat exchanger; the outlet of the first heat exchanger communicates with the ninth port; the tenth port communicates with the eighth port; the eleventh port communicates with the inlet of the compressor; the twelfth port communicates with at least one of the second end port of the third heat exchanger and the sixth port; the fifth port communicates with the second end port of the second heat exchanger; the first end port of the first throttler communicates with the first port; the second port communicates with the first end port of the second heat exchanger; the third port communicates with the first end port of the third heat exchanger.

6. The thermal management system according to claim 2, wherein the first flow direction switcher further comprises a fourth port; the first flow direction switcher further has a second working state; in the second working state, the first port communicates with the third port; the second port communicates with the fourth port;

the thermal management system comprises a third flow direction switcher; the third flow direction switcher comprises a ninth port, a tenth port, an eleventh port and a twelfth port; the third flow direction switcher comprises a first working way and a second working way; in the first working way, the ninth port communicates with the tenth port;

the eleventh port communicates with the twelfth port; in the second working way, the ninth port communicates with the twelfth port; the tenth port communicates with the eleventh port;

in the heating mode and the heating and dehumidification mode, the third flow direction switcher is in the first working way; the ninth port communicates with the outlet of the first heat exchanger; the tenth port communicates with the second end port of the first throttler or the inlet of the second throttler; the eleventh port communicates with the inlet of the compressor; the twelfth port is capable of communicating with at least one of the second end port of the second heat exchanger and the second end port of the third heat exchanger.

7. The thermal management system according to claim 6, wherein the thermal management system has a battery single heating mode and a battery single cooling mode; the controller is capable of executing the battery single heating mode and the battery single cooling mode; in the battery single heating mode and the battery single cooling mode, the first flow direction switcher is in the second working state; the first port communicates with the first end port of the first throttler; the second port communicates with the first end port of the second heat exchanger; the third port communicates with the first end port of the third heat exchanger; the fourth port communicates with the second end port of the first throttler; the ninth port communicates with the outlet of the first heat exchanger; the tenth port communicates with the second end port of the second heat exchanger; the eleventh port communicates with the inlet of the compressor; the twelfth port communicates with the second end port of the third heat exchanger; the first throttler is in the throttling state; the second throttler is in the cut-off state;

in the battery single heating mode, the third flow direction switcher is in the second working way; the compressor, the first heat exchange portion, the first throttler and the second heat exchanger are capable of being in fluid communication; the first throttler is disposed between the outlet of the first heat exchange portion and the inlet of the second heat exchanger; the first pump, the battery heat exchanger and the second heat exchange portion are capable of being in fluid communication; the first heat exchange portion exchanges heat with the second heat exchange portion;

in the battery single cooling mode, the third flow direction switcher is in the first working way; the compressor, the second heat exchanger, the first throttler and the first heat exchange portion are capable of being in fluid communication; the first throttler is disposed between the outlet of the second heat exchanger and the inlet of the first heat exchange portion; the first pump, the battery heat exchanger and the second heat exchange portion are capable of being in fluid communication; the first heat exchange portion exchanges heat with the second heat exchange portion.

8. The thermal management system according to claim 7, wherein the thermal management system comprises a damper located in the air conditioning box; the damper is located between the first heat exchanger and the fourth heat exchanger; an opening degree of the damper is controlled by the controller so as to control air volume flowing through the first heat exchanger;

the thermal management system has a hybrid heating mode; the controller is capable of executing the hybrid heating mode; in the hybrid heating mode, the first flow direction switcher is in the second working state; the first port communicates with the first end port of the first throttler; the second port communicates with the first end port of the second heat exchanger; the third port communicates with the first end port of the third heat exchanger; the fourth port communicates with the second end port of the first throttler; the third flow direction switcher is in the second working way; the ninth port communicates with the outlet of the first heat exchanger; the tenth port communicates with the second end port of the second heat exchanger; the eleventh port communicates with the inlet of the compressor; the twelfth port communicates with the second end port of the third heat exchanger; the first throttler is in the throttling state; the second throttler is in a cut-off state; the damper is controlled by the controller, so that air flows through the first heat exchanger; the compressor, the first heat exchanger, the first heat exchange portion, the first throttler and the second heat exchanger are capable of being in fluid communication; the first throttler is disposed between the outlet of the first heat exchange portion and the inlet of the second heat exchanger; the first pump, the battery heat exchanger and the second heat exchange portion are capable of being in fluid communication; the first heat exchange portion exchanges heat with the second heat exchange portion.

9. The thermal management system of claim 8, wherein the thermal management system operates in the hybrid heating mode; the opening degree of the damper is controlled by the controller, so that the air does not flow through the first heat exchanger, thereby switching the thermal management system from the hybrid heating mode to the battery single heating mode.

10. The thermal management system according to claim 6, wherein the thermal management system has a hybrid heat exchange mode; the controller is capable of executing the hybrid heat exchange mode; in the hybrid heat exchange mode, the first flow direction switcher is in the second working state; the first port communicates with the first end port of the first throttler; the second port communicates with the first end port of the second heat exchanger; the third port communicates with the first end port of the third heat exchanger; the third flow direction switcher is in the second working way; the ninth port communicates with the outlet of the first heat exchanger; the tenth port communicates with the second end port of the second heat exchanger; the eleventh port communicates with the inlet of the compressor; the twelfth port communicates with the second end port of the third heat exchanger; the second end port of the first throttler communicates with the fourth port and the inlet of the second throttler; the first throttler is in the throttling state; the second throttler is in the throttling state or in a conducting state; the compressor, the first heat exchange portion, the first throttler and the second heat exchanger are capable of being in fluid communication; the first throttler is disposed between the outlet of the first heat exchange portion and the inlet of the second heat exchanger; the compressor, the first heat exchange portion, the first throttler, the second throttler and the fourth heat exchanger are capable of being in fluid communication; the second throttler is disposed between the outlet of the first heat exchange portion and the inlet of the fourth heat exchanger; the first pump, the battery heat exchanger and the second heat exchange portion are capable of being in fluid communication; the first heat exchange portion exchanges heat with the second heat exchange portion.

11. The thermal management system according to claim 1, wherein the thermal management system comprises a first multi-way device; the first multi-way device comprises a first connection port, a second connection port and a third connection port; the first connection port communicates with the inlet of the compressor or the outlet of the first heat exchanger; the second connection port communicates with the second end port of the second heat exchanger; the third connection port communicates with the second end port of the third heat exchanger;

the first multi-way device comprises a working state and a non-working state; when the first multi-way device is in the non-working state, the first connection port, the second connection port and the third connection port are capable of being not in fluid communication; when the first multi-way device is in the working state, the first connection port communicates with at least one of the second connection port and the third connection port.

12. The thermal management system according to claim 1, wherein the thermal management system further comprises a second multi-way device, a third multi-way device and a fifth heat exchanger;

the thermal management system comprises a first bypass branch and a second bypass branch; the first bypass branch is connected in parallel with the battery heat exchanger, and one of the battery heat exchanger and the first bypass branch is selected to be connected to a loop through the second multi-way device; the fifth heat exchanger is connected in parallel with the second bypass branch, and one of the fifth heat exchanger and the second bypass branch is selected to be connected to a loop through the third multi-way device.

13. The thermal management system according to claim 12, wherein the thermal management system comprises a second pump and a fourth multi-way device; the thermal management system comprises a first pipeline and a second pipeline; the first pump, the second heat exchange portion, the heater, the battery heat exchanger and the second multi-way device are disposed in the first pipeline; the second pump, the motor heat exchanger, the fifth heat exchanger and the third multi-way device are disposed in the second pipeline; the first pipeline and the second pipeline are capable of being communicated to form a loop through the fourth multi-way device; or, a loop formed by the first pipeline itself and a loop formed by the second pipeline itself are capable of being independent with each other through the fourth multi-way device.

14. A control method of a thermal management system, the thermal management system comprising a compressor, a first heat exchanger, a second heat exchanger, a third heat exchanger, a first throttler, a first flow direction switcher and a controller; the first flow direction switcher comprising a first port, a second port and a third port; the first flow direction switcher having a first working state; in the first working state, the first port communicating with at least one of the second port and the third port; the controller being configured to execute the control method of the thermal management system, so as to control a working state of the thermal management system;

the control method of the thermal management system comprising: controlling the thermal management system to enter a heating mode by the controller; in the heating mode, the first throttler being in a throttling state; the first flow direction switcher being in the first working state; an outlet of the compressor communicating with an inlet of the first heat exchanger; an outlet of the first heat exchanger communicating with a second end port of the first throttler; a first end port of the first throttler communicating with the first port; the first port communicating with the second port; the second port communicating with a first end port of the second heat exchanger; a second end port of the second heat exchanger communicating with an inlet of the compressor; or, the first port communicating with the third port; the third port communicating with a first end port of the third heat exchanger; a second end port of the third heat exchanger communicating with the inlet of the compressor;

wherein the third heat exchanger comprises a first heat exchange portion and a second heat exchange portion; the first heat exchange portion is capable of being not in fluid communication with the second heat exchange portion; the first heat exchange portion and the second heat exchange portion are configured to perform heat exchange; the first heat exchange portion is communicated between the third port and the inlet of the compressor; or, the first heat exchange portion is communicated between the third port and the outlet of the compressor;

the thermal management system further comprises a first pump, a battery heat exchanger, a motor heat exchanger and a heater;

the heating mode comprises a rapid heating mode and a waste heat recovery mode; in the rapid heating mode and the waste heat recovery mode, the first throttler is in the throttling state; the first port communicates with the third port; the third port communicates with a port of the first heat exchange portion; another port of the first heat exchange portion communicates with the inlet of the compressor; the compressor, the first heat exchanger, the first throttler and the first heat exchange portion are capable of being in fluid communication; the first throttler is disposed between the outlet of the first heat exchanger and an inlet of the first heat exchange portion;

in the rapid heating mode, the heater, the first pump and the second heat exchange portion are capable of being in fluid communication; the first heat exchange portion exchanges heat with the second heat exchange portion; in the waste heat recovery mode, the battery heat exchanger, the first pump and the second heat exchange portion are capable of being in fluid communication; or, the battery heat exchanger, the motor heat exchanger, the first pump and the second heat exchange portion are capable of being in fluid communication; the first heat exchange portion exchanges heat with the second heat exchange portion.

15. A thermal management system, comprising: a refrigerant system and a coolant system;

the refrigerant system including a compressor, a first heat exchanger, a second heat exchanger and a first throttler; the first throttler having a throttling state and a cut-off state; the coolant system including a first pump and a battery heat exchanger;

wherein the thermal management system further includes a third heat exchanger and a damper; the third heat exchanger includes a first heat exchange portion and a second heat exchange portion which are capable of exchanging heat with each other; the first heat exchange portion and the second heat exchange portion are capable of being not in fluid communication; the first heat exchange portion is connected to the refrigerant system; the second heat exchange portion is connected to the coolant system; the damper is located on a windward side of the first heat exchanger; the damper is configured to control an air volume flowing through the first heat exchanger;

the first heat exchanger is positioned between an outlet of the compressor and an inlet of the first heat exchange portion;

the thermal management system includes a battery single heating mode and a hybrid heating mode;

in the battery single heating mode and the hybrid heating mode, the first throttler is in the throttling state; the compressor, the first heat exchanger, the first heat exchange portion, the first throttler, the second heat exchanger are communicated to form a refrigerant circuit; the first throttler is disposed between an outlet of the first heat exchange portion and an inlet of the second heat exchanger; the first pump, the second heat exchange portion and the battery heat exchanger are communicated to form a coolant circuit;

in the battery single heating mode, the damper is controlled so that wind does not flow through the first heat exchanger;

in the hybrid heating mode, the damper is controlled to allow the wind to flow through the first heat exchanger.

16. The thermal management system according to claim 15, further comprising a second throttler, a fourth heat exchanger and an air conditioning box; the first heat exchanger and the fourth heat exchanger being located in the air conditioning box; the fourth heat exchanger being located on the windward side of the first heat exchanger; the second throttler being disposed on an inlet side of the fourth heat exchanger; the second throttle device having a cut-off state, a conducting state and a throttling state;

wherein in the battery single heating mode and the hybrid heating mode, the second throttler is in the cut-off state;

the thermal management system includes a hybrid heat exchange mode; in the hybrid heat exchange mode, the first throttler is in the throttling state; the second throttler is in the throttling state or the conducting state;

the compressor, the first heat exchange portion, the first throttler and the second heat exchanger are communicated to form the refrigerant circuit; the first throttler is disposed between the outlet of the first heat exchange portion and the inlet of the second heat exchanger; the compressor, the first heat exchange portion, the first throttler, the second throttler and the fourth heat exchanger are communicated to form the refrigerant circuit; the outlet of the first heat exchange portion communicates with a first port of the first throttler; a second port of the first throttler communicates with an inlet of the second throttler; an outlet of the second throttler communicates with an inlet of the fourth heat exchanger; the first pump, the battery heat exchanger and the second heat exchange portion are communicated to form the coolant circuit.

* * * * *